(12) United States Patent
Sudo et al.

(10) Patent No.: US 10,557,097 B2
(45) Date of Patent: Feb. 11, 2020

(54) SOLID FUEL MANUFACTURING APPARATUS AND METHOD FOR MANUFACTURING SOLID FUEL

(71) Applicant: AISAKU CO., LTD., Toyota-shi, Aichi (JP)

(72) Inventors: Shoichi Sudo, Nisshin (JP); Wataru Yoshimura, Aichi-gun (JP); Akihisa Okuda, Konan (JP)

(73) Assignee: AISAKU CO., LTD., Toyota (JP)

( * ) Notice: Subject to any disclaimer, the term of this patent is extended or adjusted under 35 U.S.C. 154(b) by 575 days.

(21) Appl. No.: 14/391,129

(22) PCT Filed: Mar. 3, 2014

(86) PCT No.: PCT/JP2014/055282
§ 371 (c)(1),
(2) Date: Oct. 7, 2014

(87) PCT Pub. No.: WO2015/132857
PCT Pub. Date: Sep. 11, 2015

(65) Prior Publication Data
US 2015/0247101 A1    Sep. 3, 2015

(51) Int. Cl.
*C10L 5/04* (2006.01)
*C10L 5/42* (2006.01)
(Continued)

(52) U.S. Cl.
CPC .................. *C10L 5/04* (2013.01); *C10L 5/42* (2013.01); *C10L 5/445* (2013.01); *C10L 5/46* (2013.01);
(Continued)

(58) Field of Classification Search
CPC ... B01J 19/20; C10L 2290/06; C10L 2290/08; C10L 2290/145; C10L 2290/24;
(Continued)

(56) References Cited

U.S. PATENT DOCUMENTS 3,853,458 A * 12/1974 Wurr ....................... F27B 7/162
432/118
4,389,218 A    6/1983 Pike
(Continued)

FOREIGN PATENT DOCUMENTS

CA    2638159 C  *  1/2010  ............... C08B 1/00
CH    618354 A5    7/1980
(Continued)

OTHER PUBLICATIONS

May 27, 2014 International Search Report issued in International Application No. PCT/JP2014/055282 (with translation).
(Continued)

*Primary Examiner* — Latosha Hines
(74) *Attorney, Agent, or Firm* — Oliff PLC

(57) ABSTRACT

A solid fuel manufacturing apparatus includes: a mixture producing device to produce a mixture by kneading wet combustible waste and a dehydrating agent to accelerate dehydrating the combustible waste; a mixture containing device; an intake device to introduce outside air into the mixture containing device; an exhaust device to discharge exhaust air out of the mixture containing device; a drive device to rotate the mixture containing device; a control device to control operations of the drive device; and a breaking device to break up the mixture contained in the mixture containing device. The dehydrating agent is made of an emulsion containing synthetic resin. The breaking device is placed along an inner peripheral wall of the mixture containing device and configured to scoop the mixture upward in the internal space and allow the mixture to freely fall from above in the internal space by rotation of the mixture containing device.

14 Claims, 26 Drawing Sheets

(51) Int. Cl.
*C10L 5/44* (2006.01)
*C10L 5/46* (2006.01)
*C10L 5/36* (2006.01)

(52) U.S. Cl.
CPC ........... *C10L 5/363* (2013.01); *C10L 2290/08* (2013.01); *C10L 2290/24* (2013.01); *C10L 2290/58* (2013.01)

(58) Field of Classification Search
CPC ........... C10L 2290/28; C10L 2290/567; C10L 2290/58; C10L 2290/60; C10L 5/04; C10L 5/363; C10L 5/42; C10L 5/445; C10L 5/46; Y02E 50/30
See application file for complete search history.

(56) References Cited

U.S. PATENT DOCUMENTS

| | | | | |
|---|---|---|---|---|
| 4,435,082 | A | * | 3/1984 | Bishop ............... B01F 9/02 366/185 |
| 5,197,204 | A | * | 3/1993 | Christensen ........ F26B 11/0477 34/135 |
| 5,555,645 | A | | 9/1996 | Joslin |
| 8,118,582 | B1 | * | 2/2012 | Ileleji ............... B01F 7/02 425/197 |
| 9,272,468 | B1 | * | 3/2016 | Ileleji ............... A01N 25/002 |
| 2010/0146848 | A1 | | 6/2010 | Johnston |
| 2011/0214341 | A1 | | 9/2011 | Nafid et al. |
| 2013/0247687 | A1 | * | 9/2013 | Gebhart ............ F16C 13/04 73/862.49 |
| 2013/0256114 | A1 | * | 10/2013 | Marszal ............ C10B 21/20 201/33 |
| 2015/0240177 | A1 | | 8/2015 | Yamashita et al. |

FOREIGN PATENT DOCUMENTS

| | | | |
|---|---|---|---|
| CN | 102620546 | A | 8/2012 |
| EA | 000979 | B1 | 8/2000 |
| EP | 05498561 | A2 | 10/1992 |
| JP | A-57-30536 | | 2/1982 |
| JP | S5723689 | A | 2/1982 |
| JP | XP002744387 | | 2/1982 |
| JP | A-60-97038 | | 5/1985 |
| JP | 64-52539 | * | 3/1989 |
| JP | U-64-52539 | | 3/1989 |
| JP | 2004-043532 | A | 2/2004 |
| JP | A-2006-130443 | | 5/2006 |
| JP | A-2007-291370 | | 11/2007 |
| JP | A-2011-153282 | | 8/2011 |
| JP | A-2012-001667 | | 1/2012 |
| JP | A-2012-122044 | | 6/2012 |
| JP | 2013-072013 | A | 4/2013 |
| JP | 2014-024051 | A | 2/2014 |
| JP | A-2014-062155 | | 4/2014 |
| KR | 20-0224007 | Y1 | 5/2001 |
| WO | 2009120842 | A2 | 10/2009 |
| WO | 2010013202 | A1 | 2/2010 |
| WO | 2015128923 | A1 | 9/2015 |

OTHER PUBLICATIONS

Oct. 19, 2016 Search Report issued in European Patent Application No. 14783758.7.
Mar. 16, 2016 Office Action issued in Russian Patent Application No. 2014147611/04(076542).
Aug. 9, 2016 Office Action issued in Korean Patent Application No. 10-2014-7033016.
Fagernas et al., "Drying of biomass for second generation synfuel production," Biomass and Bioenergy, vol. 34, 2010, pp. 1267-1277.
Sep. 25, 2015 Extended European Search Report issued in Patent Application No. 14783758.7.

* cited by examiner

SOLID FUEL MANUFACTURING APPARATUS AND METHOD FOR MANUFACTURING SOLID FUEL

CROSS-REFERENCE TO RELATED APPLICATIONS

This is a national phase application based on the PCT International Patent Application No. PCT/JP2014/055282 filed on Mar. 3, 2014, the entire contents of which are incorporated herein by reference.

TECHNICAL FIELD

The present invention relates to a solid fuel manufacturing apparatus configured to remove water or moisture contained in wet combustible waste, e.g., organic wastes such as sewage sludge, food waste, and crop waste, and then break up the combustible waste to produce pellet-shaped solid fuel.

BACKGROUND ART

For instance, organic sludge generated in a sewage treating process for public sewage, industrial sewage, etc. contain combustible or flammable components and are effectively utilizable as fuel by removal of the contained moisture content. Therefore, there has recently been proposed recycling of such organic sludge into solid fuel. Examples of such techniques for producing solid fuels are disclosed in Patent Documents 1 to 3.

As the technique of making solid fuels from sludge by carbonization, Patent Document 1 discloses a method including obtaining sludge carbide by carbonization of sludge in a carbonizing furnace, cooling the sludge carbide through a water cooling conveyer, pneumatically delivering the cooled sludge by inert gas through a gas-flow conveying pipe, separating and collecting the sludge carbide contained in the conveying gas-flow by a bag filter, and then humidifying the sludge carbide by a humidifier to produce sludge carbide fuel. A technique of producing solid fuel from sewage sludge by the carbonization method as in Patent Document 1 is generally widely used and has been developed day by day for further technological advance. On the other hand, other techniques of producing solid fuel from organic sludge as in Patent Documents 2 and 3, different from the carbonization treatment method, have also been developed.

Patent Document 2 discloses a technique of producing odorless solid fuel, in factories or plants in which active sewage sludge are generated on site, in such a manner that active sludge is mixed with coffee waste having a deodorizing function and coagulated organic sludge by stirring to produce an active sludge mixture, and drying the mixture naturally at room temperature. In Patent Document 2, it takes two or three days in summer and about one week in winter to dry the active sludge mixture until a moisture content becomes about 20 to 25%. Even after stirring, drying for 5 minutes at a temperature of 80° C. in a high-temperature drying device, and then leaving at room temperature, the drying time needs one day.

In Patent Document 3, moreover, in a pre-treatment process, organic waste such as sewage sludge and food waste is pulverized and kneaded under pressure so that it is heated to 20 to 40° C. by frictional heat generated during kneading, thereby making the organic waste easy to ferment aerobic microbe existing in the organic waste. Thereafter, in a fermentation step, in a heat-insulated fermenting vessel, the fermented material is stirred to be broken up or subdivided, while the fermentation is prompted by air supply, thereby decreasing the moisture content of the fermented material. In a next breakup process, in a fermenter, the fermented material is scooped up by blades driven by a belt and dropped down to prompt further breakup and fermentation to ripen, thereby producing solid fuel. In Patent Document 3, a treatment time needed from the start of the pre-treatment process to the completion of producing the solid fuel takes at least 10 days.

RELATED ART DOCUMENTS

Patent Documents

Patent Document 1: JP-A-2007-291370
Patent Document 2: JP-A-2012-122044
Patent Document 3: JP-A-2012-1667

SUMMARY OF INVENTION

Problems to be Solved by the Invention

However, the conventional techniques in Patent Documents 1 to 3 would cause the following problems. A sludge carbonizing plant used in Patent Document 1 is generally configured to include a heating source and further various devices for heat resistance of a treatment furnace, heat protection and deodorization for workers, and others, which are required to produce solid fuel from organic waste. Therefore, the plant is likely to be complicated and large in configuration, resulting in high facility costs. This carbonizing plant needs a large amount of energy (fuel) to be supplied to the heating source in order to heat and carbonize the organic waste. This also causes high running costs.

On the other hand, in Patent Document 2, the solid fuel is produced by naturally drying the active sludge mixture. It therefore takes long to dehydrate the active sludge mixture. Thus, the productivity of solid fuel is very low. In Patent Document 3, while fermentation of the organic waste utilizes the frictional heat of the organic waste itself occurring during kneading and the supplied air, the fermented material is dropped down to be broken into small pieces, thereby increasing the contact surface area with the air to decrease the moisture content of the fermented material. This provides energy saving and low running cost, but has very low productivity of solid fuel as with Patent Document 2.

The techniques in Patent Documents 2 and 3 can be effective in converting the active sludge generated in own plants or factories into solid fuel on site. However, besides public sewage sludge systems, facilities such as food manufacturers and supermarkets daily generate a lot of organic waste such as food waste. In the case of treating such organic waste to produce solid fuel, therefore, the techniques in Patent Documents 2 and 3 are insufficient in treatment capacity and thus not practical.

The present invention has been made to solve the above problems and has a purpose to provide a solid fuel manufacturing apparatus capable of producing solid fuel at low cost by removing water or moisture from combustible waste in short time, and a method for manufacturing the solid fuel.

Means of Solving the Problems

To achieve the above purpose, one aspect of the invention provides a solid fuel manufacturing apparatus including:

mixture producing means configured to produce a mixture by kneading combustible waste containing moisture and a dehydrating agent acting to accelerate removal of the moisture from the combustible waste; mixture containing means configured to be cylindrical and rotatable and contain the mixture in an internal space; intake means configured to introduce outside air into the mixture containing means; exhaust means configured to discharge exhaust air out of the mixture containing means; drive means configured to rotate the mixture containing means; control means configured to control operations of the drive means; and breaking means configured to break up the mixture contained in the mixture containing means, wherein the dehydrating agent is a treatment agent made of an emulsion containing synthetic resin; and the breaking means is placed along an inner peripheral wall of the mixture containing means and configured to scoop the mixture upward in the internal space and allow the mixture to freely fall from above in the internal space by rotation of the mixture containing means.

According to this configuration, the moisture contained in the combustible waste is made easy to evaporate by the dehydrating agent. Thus, by only stirring of the mixture and introducing of outside air of a temperature close to an almost room temperature, e.g., 20° C., without heating the outside air to a high temperature, the solid fuel can be manufactured as the dried mixture broken up into small pieces by the breaking means. The aforementioned solid fuel manufacturing apparatus of the invention can have simple configuration and simple structure and further manufacture the solid fuel from the mixture after drying (the dried mixture) without needing a heating source to heat the combustible waste. Thus, energy (fuel) to be supplied to the heating source is also unnecessary.

The aforementioned solid fuel manufacturing apparatus of the invention can provide advantages that both initial cost and running cost are not high as compared with the conventional solid fuel manufacturing apparatus. The present apparatus can also produce the dried mixture from the combustible waste efficiently and in short treatment time. In addition, no foul odors occur during production of the dried mixture and hence no deodorization means is needed. Workability is also good.

As well as in the public sewage sludge treatment system, particularly, in facilities such as food manufacturers and supermarkets, a lot of combustible waste which is organic waste such as sewage sludge generated during sewage treatment and food waste, is daily generated. The solid fuel manufacturing apparatus of the above configuration of the invention has a high treatment capacity to dry the combustible waste 1 of several tens to hundreds kg in a treatment time, e.g., a few hours, to produce the dried mixture from the combustible waste and thus can be an apparatus suitable for making the combustible waste into solid fuel in such facilities.

In the above configuration, preferably, a load sensor is provided in a position to support the mixture containing means, and the control means is configured to control movement of the drive means based on a detection signal of the load sensor.

According to the above configuration, the mixture is uniformly stirred in the internal space of the mixture containing means, so that the surface area of the mixture exposed to the introduced outside air is more increased, thereby easily accelerating evaporation of the moisture and breaking of the mixture.

In the above configuration, preferably, the solid fuel manufacturing apparatus is installed in an interior space of a cargo container for transporting the solid fuel manufacturing apparatus to a destination.

According to the above configuration, when the cargo container enclosing the solid fuel manufacturing apparatus of the invention in the interior space is simply anchored in an installation position for the solid fuel manufacturing apparatus, installation of the solid fuel manufacturing apparatus is completed. This installation work is thus easy.

Preferably, the above configuration further includes heating means to heat the outside air to a temperature in a range of 20° C. or higher but 30° C. or lower when a temperature of the outside air to be introduced by the intake means is less than 20° C.

According to the above configuration, even if the temperature of the outside air is less than 20° C. according to seasons or environments, it is possible to prevent generation of foul odors and efficiently evaporate the moisture contained in the mixture in the atmosphere of the internal space of the mixture containing means.

Furthermore, it is preferable that the method for manufacturing solid fuel using the solid fuel manufacturing apparatus in the above aspect includes drying and breaking up the combustible waste to produce pellet-shaped solid fuel.

According to the above configuration, the dried mixture is easily combustible. Further, the dried mixture can be utilized for wide purposes in any devices configured to burn solid fuel to generate heat.

In the above configuration, preferably, the combustible waste is one of at least sewage sludge, food waste, crop waste, and vegetable waste.

According to the above configuration, when the moisture is removed from the combustible waste including combustible components, the combustible waste can be used as effective fuel resources.

Effects of the Invention

According to the solid fuel manufacturing apparatus and the solid fuel manufacturing method of the invention, it is possible to produce solid fuel at low cost by removing water or moisture contained in combustible waste in short time.

MODE FOR CARRYING OUT THE INVENTION

A detailed description of an embodiment of a solid fuel manufacturing apparatus and a solid fuel manufacturing method using this apparatus, embodying the present invention, will now be given referring to the accompanying drawings. The solid fuel manufacturing apparatus is an apparatus arranged to dry moisture or water contained in combustible waste such as at least sewage sludge, food waste, animal waste, and vegetable waste and break up the dried waste to produce pellet-shaped solid fuel. The first to fourth embodiments exemplify a case where the combustible waste is sewage sludge.

First Embodiment

Figure 1:
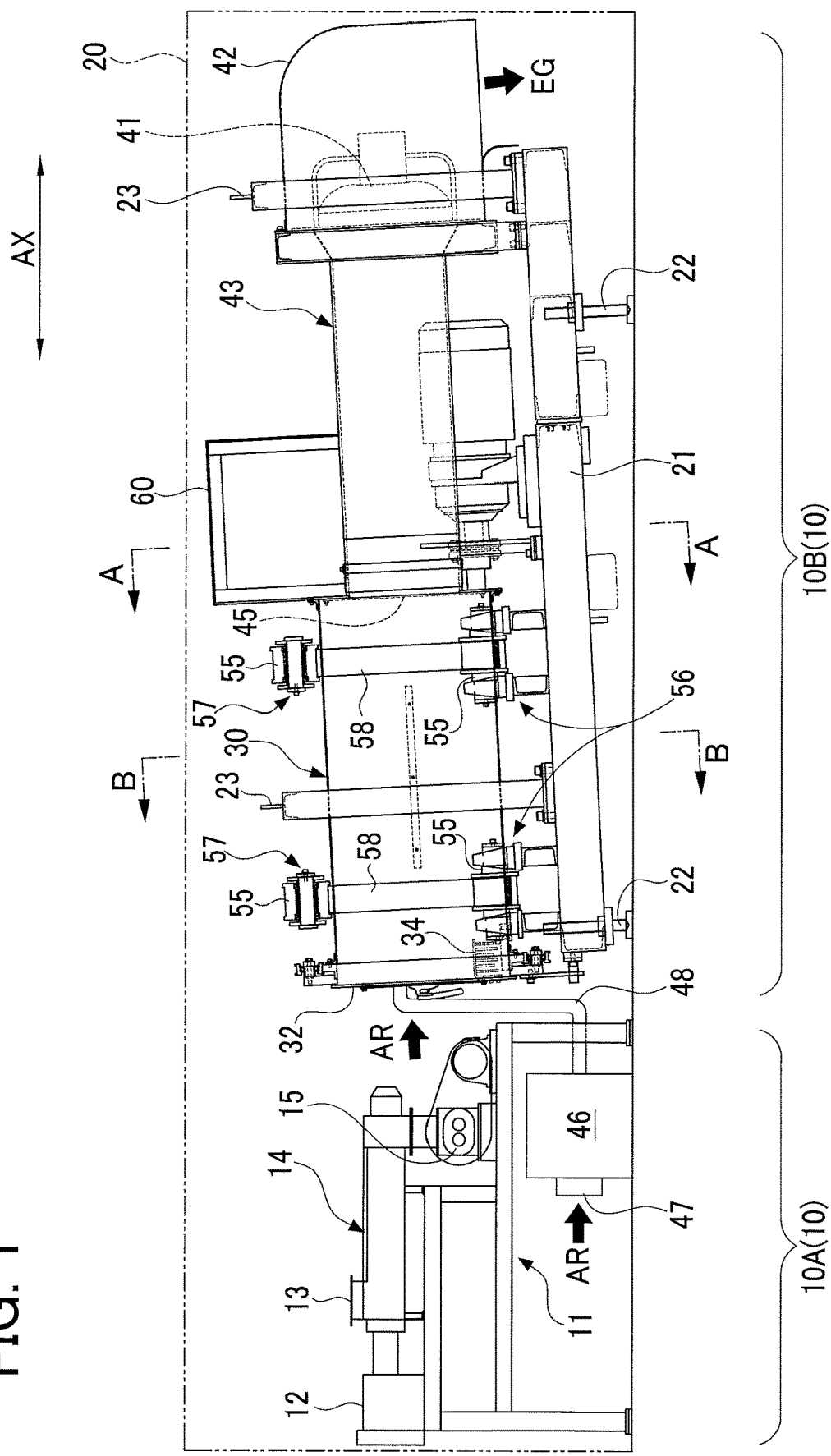
FIG. 1 is a front view of a solid fuel manufacturing apparatus of a first embodiment.

FIG. 1 is a front view showing a solid fuel manufacturing apparatus 10 of the first embodiment. This apparatus 10 mainly includes a mixture producing device 10A (a mixture producing means) and a mixture drying device 10B as shown in FIG. 1. In the first embodiment, the solid fuel manufacturing apparatus 10 is designed to have a size allowing installation in an interior space (a compartment) of a cargo container 20 for transporting the apparatus 10 to a destination. To be concrete, the apparatus 10 is configured on the assumption that it will be installed in for example the interior space of a so-called 20 ft sea-cargo container (Inner dimension; Length: 5.900 m, Width: 2.350 m, Height: 2.390 m) according to the ISO standards.

The solid fuel manufacturing apparatus 10 may be installed not only in the interior space of the cargo container 20 but also on a floor of a building or plant without using the cargo container 20. In this case, the apparatus 10 does not need to be configured with the dimension suitable for the cargo container 20.

The mixture producing device 10A is a device for producing a mixture 3 by kneading combustible waste 1 containing water or moisture (see FIG. 13) and a dehydrating liquid 2 (a dehydrating agent) for accelerating removal or dehydration of moisture from the combustible waste 1. The mixture producing device 10A includes, on a first frame 11, a raw-material charge port 12 through which the combustible waste 1 which is a raw material of solid fuel will be charged into the device 10A, a liquid inlet 13 through which the dehydrating liquid 2 mentioned later will be poured, a kneading section 14 for kneading the combustible waste 1 and the dehydrating liquid 2 by a well known technique, and an extrusion section 15 for ejecting the mixture 3 kneaded in the kneading section 14 to the outside.

Figure 13:
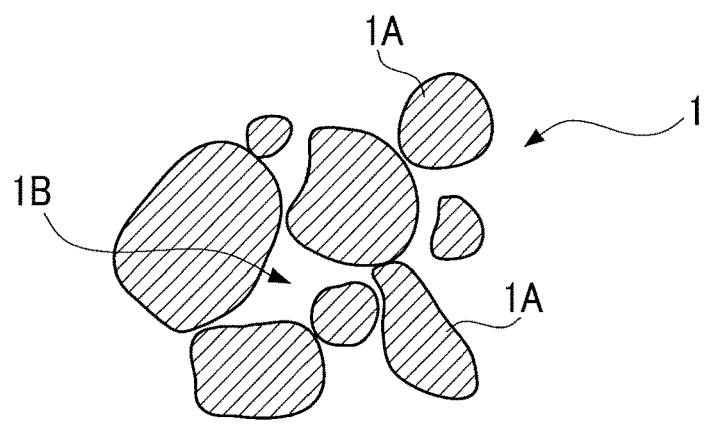
FIG. 13 is an explanatory view showing particles constituting sewage sludge to be treated in first to fourth embodiments.
Figure 14:
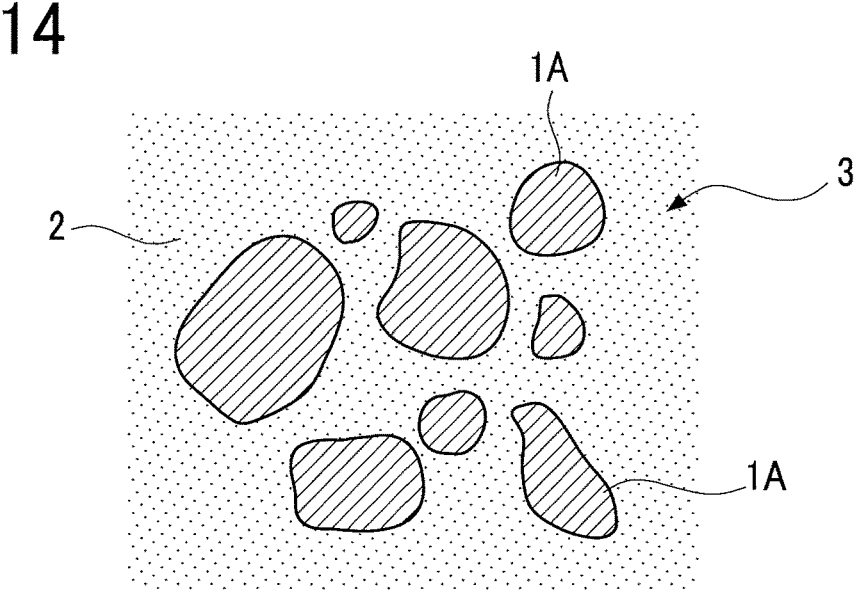
FIG. 14 is an explanatory view showing a state of the particles shown in FIG. 13, surfaces of which are made contact with a dehydrating liquid.
Figure 15:
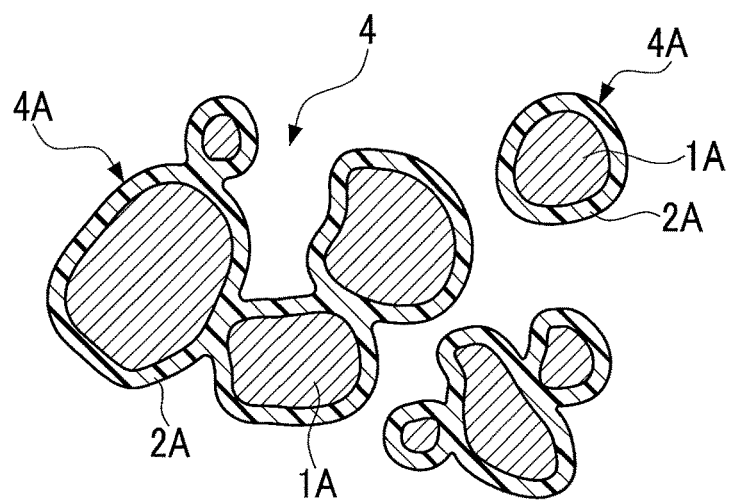
FIG. 15 is an explanatory view showing coated particles.

The dehydrating liquid 2 will be explained below referring to FIGS. 13 to 15. FIG. 13 is an explanatory view of particles 1A constituting the sewage sludge to be treated. FIG. 14 shows a state where the surface of each particle shown in FIG. 13 is contacted or exposed to the dehydrating liquid 2. FIG. 15 is an explanatory view of coated particles 4A. The dehydrating liquid 2 is made of an emulsion containing synthetic resin. Specifically, the dehydrating liquid 2 is an emulsion containing synthetic resin, for example, acrylic resin, urethane resin, and or polyvinyl acetate resin, that is, an emulsion containing various synthetic resins as listed in Table 1 and being appropriately diluted with water.

TABLE 1

| Dehydrating | | | | Dilution Rate | |
| --- | --- | --- | --- | --- | --- |
| Liquid (DL) | Emulsion Part No. | Manufacturer | Synthetic Resin | Emulsion | Water |
| DL: A1 | Pegal 756 | Koatsu Gas Kogyo Co., Ltd. | Acrylic resin | 10 weight part | 90 weight part |
| DL: A2 | Pegal 756 | Koatsu Gas Kogyo Co., Ltd. | Acrylic resin | 20 weight part | 80 weight part |
| DL: B1 | Pegal 848 | Koatsu Gas Kogyo Co., Ltd. | Acrylic styrene resin | 10 weight part | 90 weight part |
| DL: B2 | Pegal 848 | Koatsu Gas Kogyo Co., Ltd. | Acrylic styrene resin | 20 weight part | 80 weight part |
| DL: C1 | Pegal 852 | Koatsu Gas Kogyo Co., Ltd. | Acrylic styrene resin | 10 weight part | 90 weight part |
| DL: C2 | Pegal 852 | Koatsu Gas Kogyo Co., Ltd. | Acrylic styrene resin | 20 weight part | 80 weight part |

TABLE 1-continued

| Dehydrating Liquid (DL) | Emulsion Part No. | Manufacturer | Synthetic Resin | Dilution Rate | |
|---|---|---|---|---|---|
| | | | | Emulsion | Water |
| DL: D | SC-F | Gen Gen Corp. | Acrylic resin | 100 weight part | Absent |
| DL: E | SC-E | Gen Gen Corp. | Polyvinyl acetate resin | 100 weight part | Absent |
| DL: F1 | XDA-G1A | Gen Gen Corp. | Acrylic resin | 100 weight part | Absent |
| DL: F2 | XDA-G1A | Gen Gen Corp. | Acrylic resin | 50 weight part | 50 weight part |
| DL: F3 | XDA-G1A | Gen Gen Corp. | Acrylic resin | 10 weight part | 90 weight part |
| DL: G1 | XDA-G1B | Gen Gen Corp. | Acrylic resin | 50 weight part | 50 weight part |
| DL: G2 | XDA-G1B | Gen Gen Corp. | Acrylic resin | 10 weight part | 90 weight part |
| DL: H | XDA/AHP-A001 | Atom Support Co., Ltd. | Acrylic resin | 100 weight part | Absent |

This dehydrating liquid 2 has the following properties. When the dehydrating liquid 2 is mixed with the mixture 3 formed of the particles 1A constituting the combustible waste 1 by the mixture producing device 10A so that the dehydrating liquid 2 contacts the surface of each particle 1A as shown in FIGS. 13 to 15, the dehydrating liquid 2 enters a void 1B formed between the particles 1A in the combustible waste 1, thus uniformly coating the surface of each particle 1A. The dehydrating liquid 2 containing the aforementioned synthetic resins also has a property of relatively increasing the action of accelerating drying of the particles 1A.

As shown in FIG. 15, furthermore, a synthetic resin coating 2A made of the aforementioned synthetic resins has volatility. Thus, even during storage of the dried combustible material 4 produced as solid fuel from the dried mixture 3, moisture absorption to dried combustible material 4 can be reduced. This coating 2A functions to prevent an increase in moisture content of the dried combustible material 4 and suppress the dried combustible material 4 from becoming sticky. In the present embodiment, a moisture content percentage w (weight %) is a ratio of the moisture content (water weight) h (kg) to a total weight W (kg) of a target object for measurement such as the combustible waste 1, the mixture 3, and the dried combustible material 4. This moisture content percentage w is calculated by the following formula (1):

$$w = h/W \times 100 \qquad (1)$$

In a drying step of the mixture 3 using the dehydrating liquid 2 having the above properties, outside air AR at about 20° C. is blown onto the mixture 3 to dry it in the mixture drying device 10B mentioned later, thereby drying the dehydrating liquid 2 stuck to the surface of each particle 1A to form the synthetic resin coating 2A and also evaporating the moisture contained in the particles 1A.

Accordingly, the coated particles 4A are produced, each consisting of the particle 1A with reduced moisture content percentage and the synthetic resin coating 2A covering the surface of the particle 1A. The mixture 3 contracts or shrinks during drying and thus it can be divided into small pieces. Thus, dried material 4 made of the coated particles 4A closely adhering to each other through the coatings 2A is produced.

Figure 2:
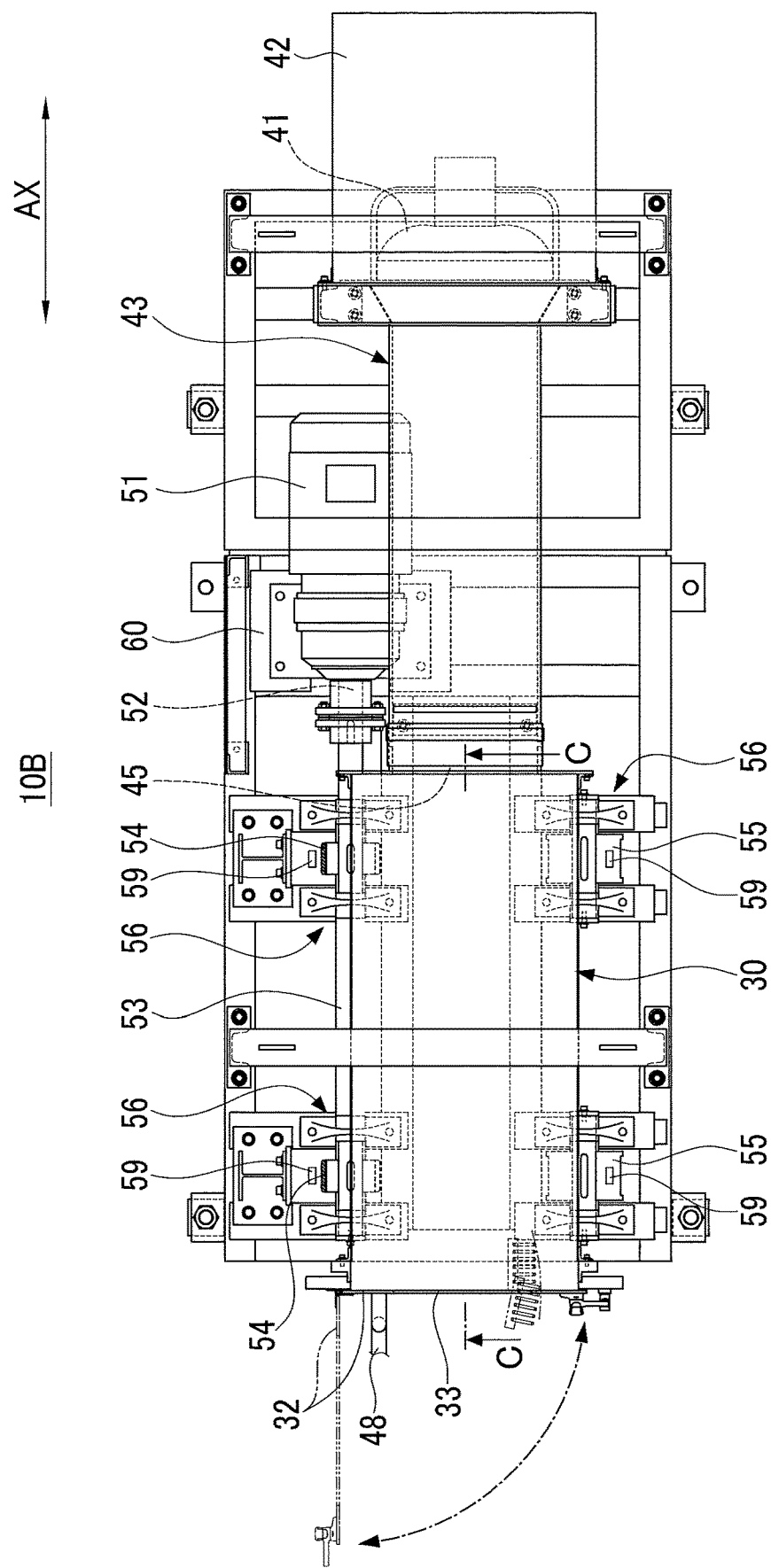
FIG. 2 is a plan view of the solid fuel manufacturing apparatus shown in FIG. 1.
Figure 3:
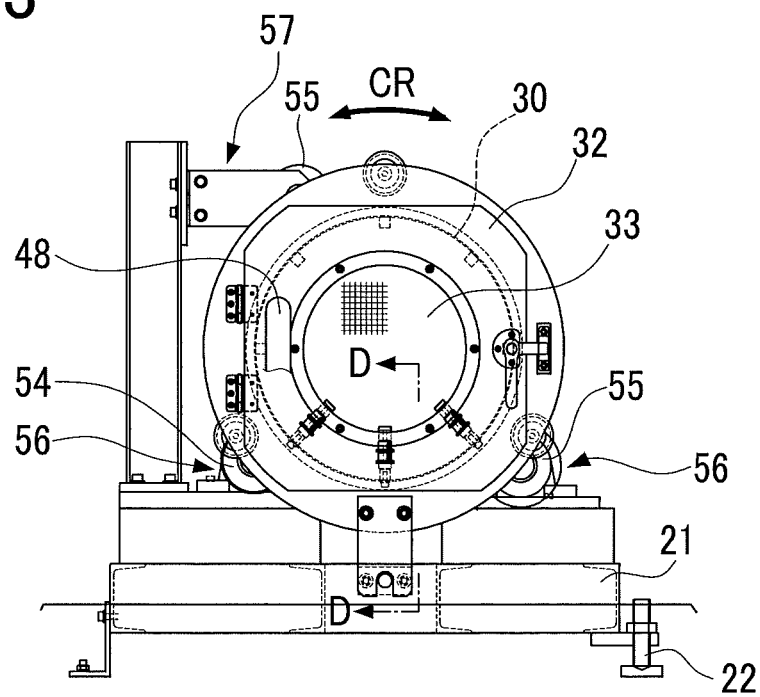
FIG. 3 is a left side view of the solid fuel manufacturing apparatus shown in FIG. 1.
Figure 4:
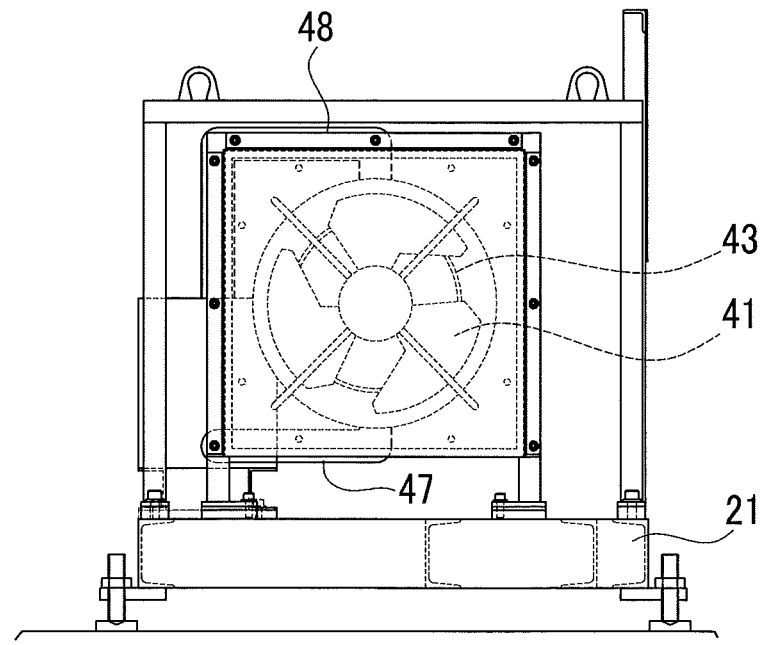
FIG. 4 is a right side view of the solid fuel manufacturing apparatus shown in FIG. 1.

Next, the mixture drying device 10B will be explained. FIG. 2 is a plan view of the solid fuel manufacturing apparatus 10. FIG. 3 is a left side view of the apparatus 10 and FIG. 4 is a right side view of the same. The mixture drying device 10B includes a rotary drum 30 (mixture containing means), an intake opening 33 (air intake means), an exhaust fan 41 (exhaust means), a heat pump 46 (heating means), a motor 51 (drive means), a control board 60 (control means), blades 72 (see FIG. 6) (breaking means), and others.

In the mixture drying device 10B, height adjustment bolts 22 for adjusting the height of the device 10B from an installation surface, and carrier hooks 23 used for lifting up the device 10B during transport are provided of a second frame 21 having a rectangular frame-like outer shape. On this second frame 21, there are mounted the motor 51, drum lower side supporting parts 56, drum upper side supporting parts 57, the control board 60, and others.

Figure 6:
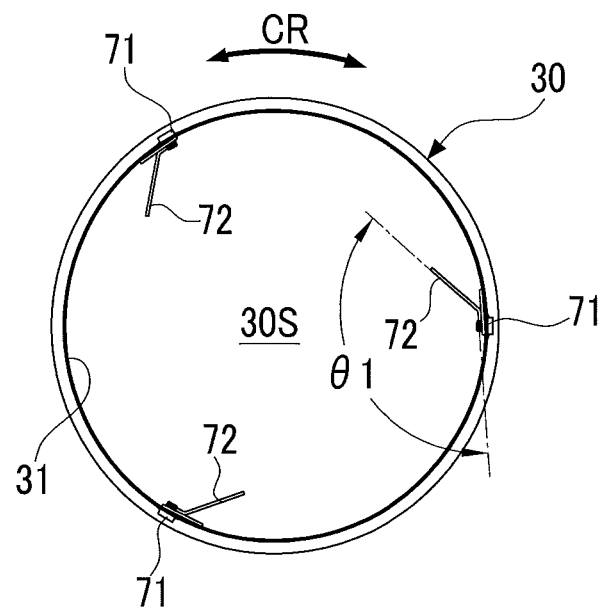
FIG. 6 is a view showing an inner state of a batch drum taken along an arrow B-B in FIG. 1 to explain attachment positions of blades.

The rotary drum 30 is a drum configured to be cylindrical and rotatable and to contain the mixture 3 in an internal space (a chamber) 30S (see FIG. 6). In the first embodiment, it is a batch rotary drum configured to treat the mixture 3 just charged into the internal space 30S. This rotary drum 30 is supported by two drive rollers 54 and four driven rollers 55. The drive rollers 54 are rotatably axis-supported one each by two of the drum lower side supporting parts 56 arranged in four places.

On an outer periphery of the rotary drum 30, roller track parts 58 are provided in two places. Each roller track part 58 is a surface with which the corresponding drive roller 54 is in pressure contact while rotating. This rotational force of the drive rollers 54 is transmitted to the rotary drum 30. The driven rollers 55 contacting with the roller track parts 58 are driven to rotate, thereby holding and supporting the rotary drum 30 during rotation thereof.

To be concrete, two of the four driven rollers 55 are rotatably axis-supported one each by the remaining two drum lower side supporting parts 56. The remaining two driven rollers 55 are rotatably axis-supported by the two drum upper side supporting parts 57 provided in a standing form on the second frame 21 as shown in FIGS. 1 and 3. Each supporting part 57 is configured to adjust the axial height of the corresponding driven roller 55 in an up-down direction. By positional adjustment of the height of the driven roller 55 axis-supported by the supporting part 57, the pressure applied to the rotary drum 30 by the drive roller 54 is adjusted.

The motor 51 is a drive source to rotate the rotary drum 30 and is configured to rotate a power transmission shaft 53 coupled to a motor output shaft 52 to transmit the rotational force to the driven rollers 54. The control board 60 has a function to operate the solid fuel manufacturing apparatus 10, for example, actuation ON/OFF of the mixture producing device 10A, rotation ON/OFF of the rotary drum 30, actuation ON/OFF of the exhaust fan 41, and actuation ON/OFF of the heat pump 46.

This control board 60 further includes electrical control devices such as a timer function, an inverter for controlling the number of rotations of the motor 51, an inverter for controlling the quantity of air to be ventilated by the exhaust fan 41, devices for operation controls in each operation of the solid fuel manufacturing apparatus 10 such as setting or changing of the number of rotations and the rotational direction of the rotary drum 30, and a sequencer for programming.

The drum lower side supporting parts 56 in four places are each provided with a load sensor 59. Each of the four load sensors 59 detects a load that acts on a predetermined portion of each drum lower side supporting part 56 (e.g., a rotary shaft of the drive roller 54 or a bearing thereof, a rotary shaft of the driven roller 55 or a bearing thereof, etc.), among the loads acting on the entire rotary drum 30 including the mixture 3 stored in the internal space 30S. The load sensors 59 are electrically connected to the control board 60 to output detection signals to the control board 60.

Accordingly, based on a signal detected by each load sensor 59, the control board 60 allows a worker to recognize where the mixture 3 exists in the internal space 30S of the rotary drum 30. Specifically, upon receipt of the detection signals from the load sensors 59 representing that the mixture 3 is unevenly distributed to one side in the internal space 30S of the rotary drum 30, causing the gravity center of the entire rotary drum 30 to shift toward the intake opening 33 or an exhaust opening 45, the control board 60 reverses the rotation direction of the rotary drum 30 to return the gravity center of the entire drum 30 to an original position and controls the rotation of the drum 30 to prevent the mixture 3 from staying in the one-sided position.

In the first embodiment, based on the detection signals transmitted from the load sensors 59 to the control board 60, the electrical control devices in the control board 60 automatically perform operation controls for changing the number of rotations of the rotary drum 30, changing the rotational direction of the drum 30, and a combined operation of rotation and stop of the drum 30, and others.

The blades 72 serving as the breaking means of the invention will be explained below. FIG. 6 is a view showing an inner state of the rotary drum 30 of a batch treatment type taken along an arrow B-B in FIG. 1 to explain attachment positions of the blades 72. The blades 72 function as a member for breaking up the mixture 3 contained in the internal space 30S of the rotary drum 30 and are arranged along an inner peripheral wall 31 of the rotary drum 30. The blades 72 are configured to scoop or lift the mixture 30 (or the dried combustible material 4) upward in the internal space 30S and allow the same to freely fall from above in the internal space 30S by automatic movement of the rotary drum 30.

Concretely, each blade 72 is formed of e.g. a plate material bent into a nearly L-shape with a bending angle θ1 of 135° defined by two sides (one plane corresponding to one side of the blade 72 is tilted at 45° with respect to a tangent direction of an attachment position of a corresponding blade bracket 71 on the inner peripheral wall 31 as shown in FIG. 6) or an L-shape with the bending angle of 90° by a bending process. Each blade 72 is attached, at the other plane corresponding to the other side, by screw fastening to the plate-shaped bracket 71 fixed to the inner peripheral wall 31 of the rotary drum 30.

In the first embodiment, in FIG. 6, the blade brackets 71 are arranged on the inner peripheral wall 31 at three places at equal intervals of 120° in a circumferential direction CR of the rotary drum 30. However, the attachment positions of the brackets 71, the number of attached brackets 71, and the interval of the attached brackets 71 in the circumferential direction CR may be appropriately changed according to the property of the mixture 3 to be dried. These are not limited to those of the first embodiment.

Figure 7:
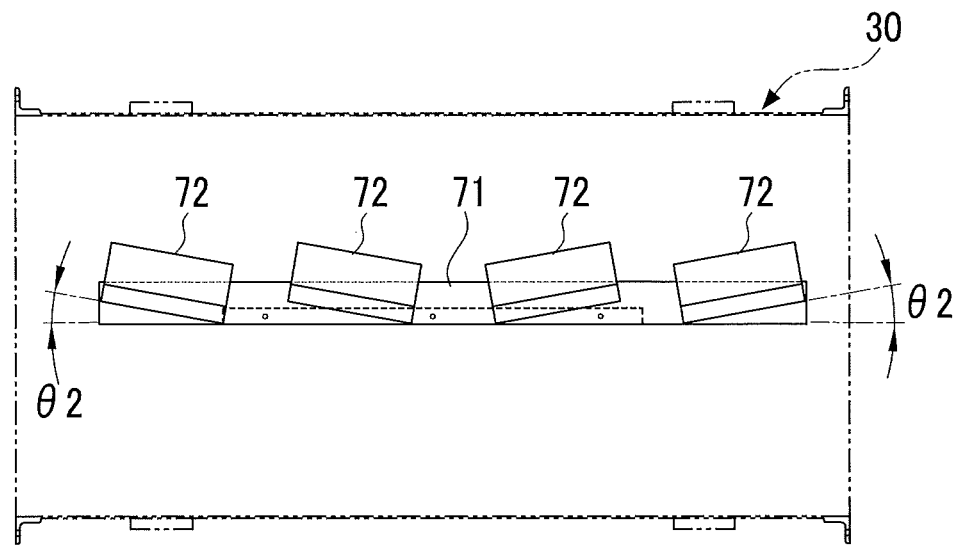
FIG. 7 is a view taken along an arrow C-C in FIG. 2 to show placement of the blades.
Figure 8:
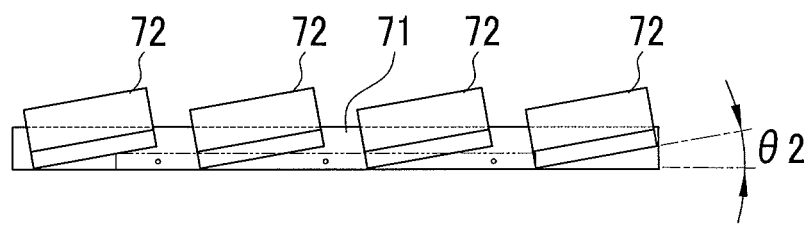
FIG. 8 is an explanatory view showing placement of blades of a first modified example.

FIG. 7 is a view taken along an arrow C-C in FIG. 2 to explain the arrangement positions of the blades 72. FIG. 8 is an explanatory view of the arrangement positions of the blades 72 of a first modified example and FIG. 9 is an explanatory view of the arrangement positions of the blades 72 of a second modified example.

Figure 9:
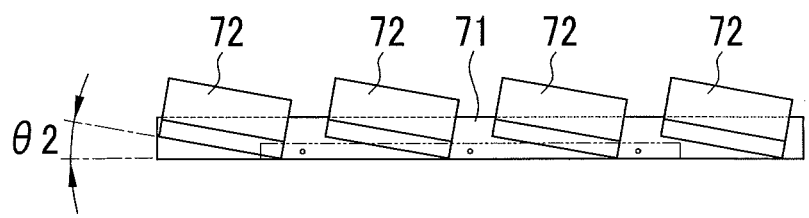
FIG. 9 is an explanatory view of placement of blades of a second modified example.

In FIGS. 7 to 9, the positions and orientations of arranged blades 72, the number of arranged blades 72, the bending angle θ1 of each blade, an attachment angle θ2 are mere examples. They are not limited to those of the first embodiment and may be appropriately changed.

FIGS. 7 to 9 show only the blades 72 attached to one of three blade brackets 71. The blades 72 may be equal in the arrangement positions and orientations, the number, the bending angle θ1, and the attachment angle θ2 among the three brackets 71. As an alternative, the blades 72 may be arranged differently among the brackets 71 as shown in FIGS. 7 to 9.

A plurality of the blades 72 (four blades in FIG. 7) are attached to one bracket 71 along the axial direction AX (a right-left direction in FIG. 1) of the rotary drum 30. To be concrete, as shown in FIG. 7, with respect to one bracket 72, the blades 72 located on a side close to a drum openable door 32 of the rotary drum 30 (a left side in FIG. 7) are attached at an inclination of about 10° in a clockwise direction and the blades 72 located on a side close to the exhaust opening 45 (a right side in FIG. 7) are attached at an inclination of about 10° in a counterclockwise direction.

First Modified Example

As shown in FIG. 8, all the blades 72 attached to one bracket 71 are inclined at about 10° in a counterclockwise direction.

Second Modified Example

As shown in FIG. 9, all the blades 72 attached to one bracket 71 are inclined at about 10° in a clockwise direction. The inclination angle of the blades 72 attached to the bracket 71 shown in FIGS. 7 to 9 may be changed appropriately according to the viscosity of the mixture 3 to be subjected to the drying treatment and others.

Figure 10:
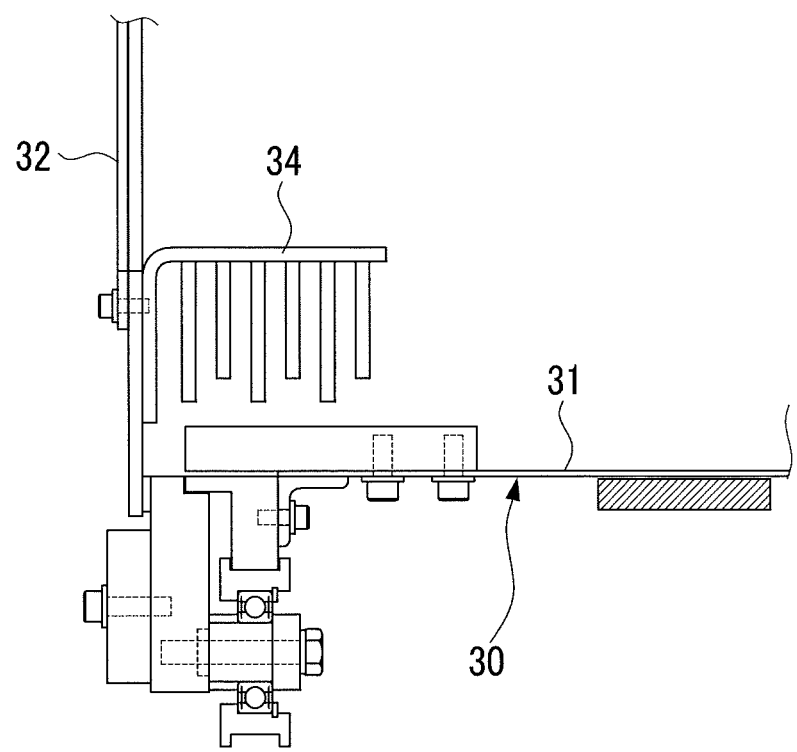
FIG. 10 is a view showing inside of the batch drum taken along an arrow D-D in FIG. 3 to explain a rake.

The rotary drum 30 includes the openable door 32 that openably closes an opening located on one side (a left side in FIG. 1) in the axial direction AX (the right-left direction in FIG. 1). The door 32 of the drum 30 is provided with an intake opening 33 formed in a mesh structure allowing air ventilation as shown in FIG. 3. The intake opening 33 is an opening through which outside air AR to be sucked by the exhaust fan 41 is introduced into the internal space 30S of the rotary drum 30. FIG. 10 is a view showing the inside of the batch drum taken along an arrow D-D in FIG. 3 to explain a rake 34.

Figure 5:
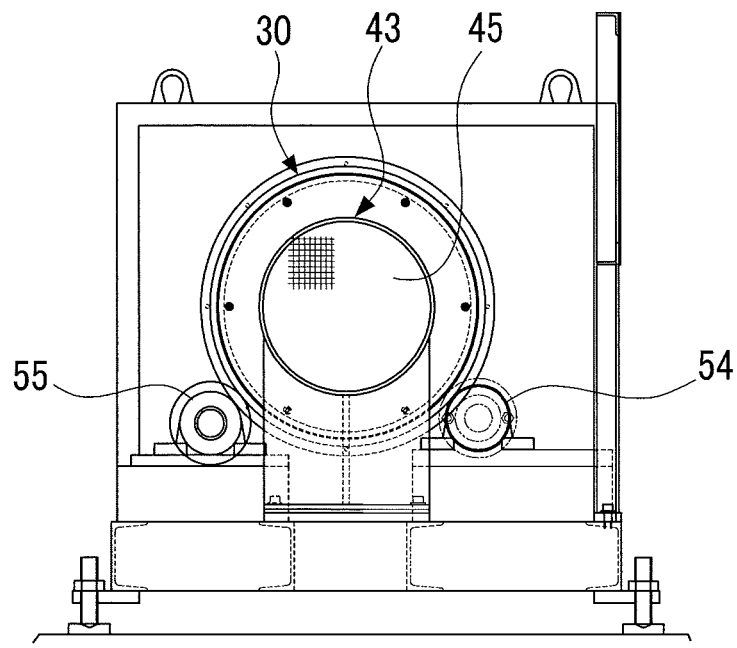
FIG. 5 is a view taken along an arrow A-A in FIG. 1.

The rake 34 is provided in a position below the intake opening 33 of the door 32 (see FIGS. 1 and 10). The rake 34 is a member formed of a plurality of rods arranged in parallel at intervals like a comb and functions to break up or divide the mixture 30 into small pieces when the mixture 30 contacts with the rake 34 during the drying treatment in the internal space 30S of the rotary drum 30. FIG. 5 is a view taken along an arrow A-A in FIG. 1. In FIG. 5, for easy viewing, the blades and the scrapers and each member related thereto are not illustrated.

An opening of the rotary drum 30 on the other side (a right side in FIG. 1) in the axial direction AX is connected to a cylindrical duct 43 so as to be rotatable with respect to the duct 43. This duct 43 functions as an intermediate passage through which the outside air AR sucked from outside into the intake opening 33 by the exhaust fan 41 covered by a food 42 is blown and supplied into the internal space 30S of the rotary drum 30. Between the rotary drum 30 and the duct 43, the exhaust opening 45 is located as shown in FIG. 5.

The exhaust opening 45 is formed with a mesh structure of a relatively small rate of hole area, whereby the mixture 3 charged in the internal space 30S and the dried combustible material 4 broken up from the mixture during drying and immediately before completely dried can be prevented from flowing in the duct 43. The duct 43 is connected between the exhaust opening 45 and the exhaust fan 41. The atmosphere in the internal space 30S of the rotary drum 30 is sucked by the exhaust fan 41 into the duct 43 through the exhaust opening 45 and then exhausted to the outside.

Figure 11:
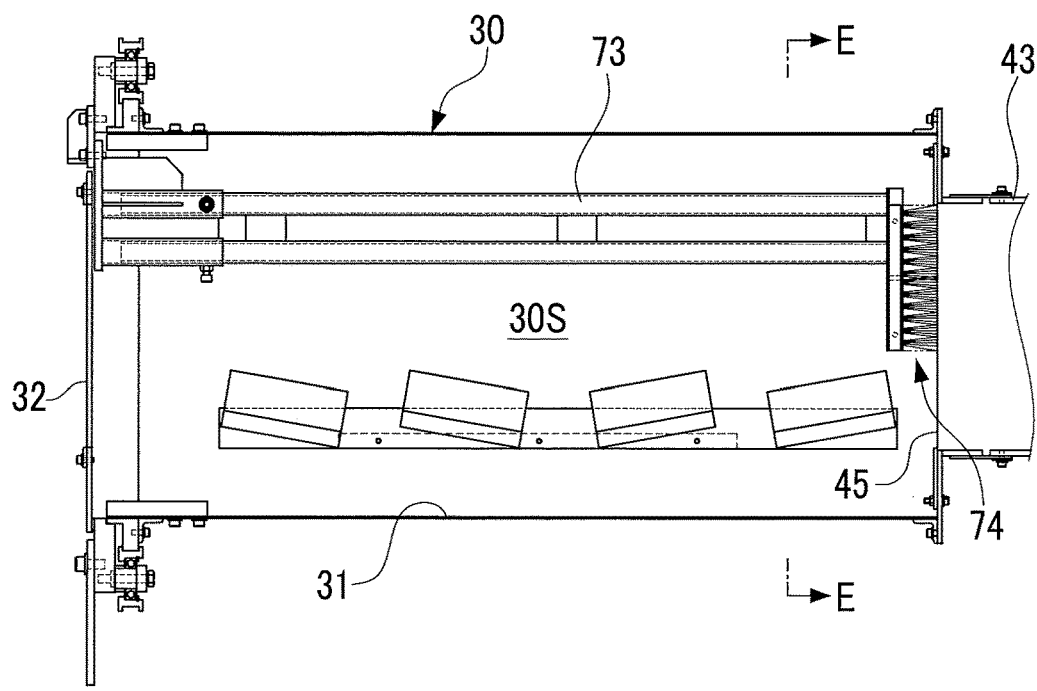
FIG. 11 is a view taken along the arrow C-C in FIG. 2 to explain a scraper.
Figure 12:
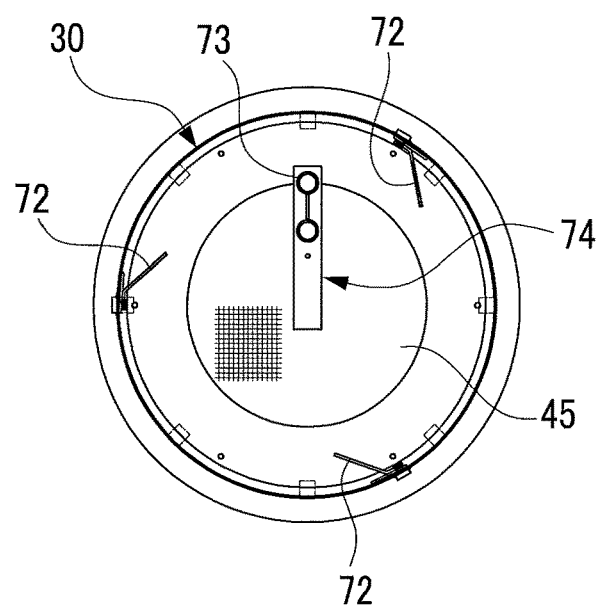
FIG. 12 is an explanatory view showing the scraper taken along an arrow E-E in FIG. 11.

FIG. 11 is a view taken along an arrow C-C in FIG. 2 to explain the scraper 74. FIG. 12 is an explanatory view showing the scraper 74 taken along an arrow E-E in FIG. 11. In the exhaust opening 45, the scraper 74 is placed as shown in FIGS. 11 and 12. The scraper 74 is a brush-shaped member to sweep the mesh of the exhaust opening 45 to remove the mixture 3 (or the dried combustible material 4) stuck thereto. The scraper 74 is fixedly supported by a scraper attaching member 73 placed in the rotary drum 30.

This scraper 74 is formed with a size enough to sweep a half or more region of the mesh of the exhaust opening 45 in a radial direction. The bristle tips of the scraper 74 are in contact with constant points of the mesh of the exhaust opening 45. Accordingly, when the mesh of the exhaust opening 45 rotates as the rotary drum 30 rotates, the scraper 74 can remove the mixture 3 (or the dried combustible material 4) sticking to over the entire mesh of the exhaust opening 45, from the mesh of the exhaust opening 45.

As shown in FIG. 1, the heat pump 46 is placed under the first frame 11 of the mixture producing device 10A. An air discharge part 48 of the heat pump 46 is connected to the door 32 of the mixture drying device 10B as shown in FIGS. 1 to 3. If the temperature of the outside air AR is less than 20° C., the heat pump 46 heats or warms the outside air AR introduced from the air intake part 47 to a temperature in a range of 20° C. or more but 30° C. or less. The warmed outside air AR is supplied to the internal space 30S of the rotary drum 30 through the air discharge part 48.

A method for manufacturing solid fuel by use of the solid fuel manufacturing apparatus 10 will be explained below. Firstly, in the mixture producing device 10A, a predetermined amount (e.g., several tens to a few hundreds kg per batch) of the combustible waste 1 is charged through the raw-material charge port 12, the dehydrating liquid 2 is also poured through the liquid inlet 13, and the combustible waste 1 and the dehydrating liquid 2 are kneaded in the kneading section 14 to produce the mixture 3. This mixture 3 is then ejected from the extrusion part 15.

In the first embodiment, the combustible waste 1 and the dehydrating liquid 2 are mixed at a weight ratio of 97%:3%. The percentage of moisture content of the mixed combustible waste 1 and dehydrating liquid 2 is approximately 70 to 80%. The total volume of the mixture 3 to be charged into the internal space 30S of the rotary drum 30 is within a range equal to or less than half of the volume ratio of the entire internal space 30S and more preferably the amount of the mixture 3 to be charged into the internal space 30S is within a range equal to or less than one-third of the height corresponding to the inner diameter of the internal space 30S.

This is because the rotation of the rotary drum 30 causes the plurality of blades 72 to scoop up the mixture 3 charged in the internal space 30S and allow the mixture 3 to freely fall from above in the internal space 30S. Thus, while the mixture 3 repeats such complicated motions, the mixture 3 is dried by exposure to the outside AR sucked by the exhaust fan 41 and thus is further broken up or subdivided. At that time, since the charge amount of the mixture 3 is within the aforementioned range, the mixture 3 is actively stirred, enabling increasing the surface area of the mixture 3 exposed to the outside air AR. This accelerates drying of the mixture 3, prompting evaporation of the moisture and contraction of the mixture 3, thereby making the mixture 3 easy to break into small pieces.

A worker charges the mixture 3 ejected from the extrusion section 15 into the internal space 30S of the rotary drum 30 and then closes the internal space 30S with the drum openable door 32. Prior to the drying treatment of the mixture 3, the worker detects the total weight of the rotary drum 30 right after charging therein the mixture 3 by use of the load sensors 59 to measure in advance the weight of the mixture 3 before drying (pre-drying weight). Subsequently, the worker operates the control board 60 to for example rotate the rotary drum 30 in one way at a circumferential velocity of 140 mm/sec. and activate the exhaust fan 41 to introduce outside air AR in the internal space 30S under conditions such as an air velocity of 3 to 6 m/sec. If the temperature of the outside air AR is less than 20° C., the heat pump 46 is activated to heat the outside air AR to be supplied into the internal space 30S up to a temperature in a range of 20° C. or higher but 30° C. or lower.

The mixture drying device 10B in this state is continuously operated for about 5 hours. Meanwhile, while the mixture 3 charged in the internal space 30S is repeatedly scooped up and then dropped down by free fall in the internal space 30S by each blade 72, the mixture 3 repeats movement back and forth in the axial direction AX by operation control of the rotary drum 30 based on the detection signals from the load sensors 59.

In the drum openable door 32 of the mixture drying device 10B, the intake opening 33 is provided in an opposite position to the exhaust opening 45. Thus, even when the outside air AR flows in the internal space 30S through the intake opening 33 by the exhaust fan 41, exhaust air EG is easily discharged from the internal space 30S through the exhaust opening 45. This configuration provides high intake and exhaust efficiency. Accordingly, the atmosphere of the internal space 30S does not come to a saturated state even when the moisture or water is evaporated from the mixture 3 during drying. Thus, the evaporation of the moisture/water in the atmosphere of the internal space 30S is not interfered in the course of stirring the mixture 3.

After time-up, the worker measures the percentage of moisture content of the mixture 3 based on the detection signals of the load sensors 59. To be concrete, after time-up of the drying step of the mixture 3, the worker detects the total weight of the rotary drum 30 with the mixture 3 remaining contained in the internal space 30S by use of the load sensors 59 to measure the weight of the mixture 3 after drying (post-drying weight). Then, the worker finds a ratio of the post-drying weight (i.e., a percentage of moisture content of the moisture contained in the mixture 3) to the pre-drying weight of the mixture 3 and determines whether or not this moisture content percentage is equal to or less than 20%. If the moisture content percentage exceeds 20%, the worker operates the control board 60 again to extend the drying time of the mixture 3 until the moisture content percentage decreases to 20% or less. If the moisture content percentage is 20% or less, the worker stops the drying treatment.

The mixture 3 charged in the internal space 30S is dried to the moisture content percentage of 20% or less by the mixture drying device 10B, forming the dried combustible material 4 having an energy of about 4000 to 5000 kcal/kg. In this way, the moisture contained in the combustible waste 1 is dried and this waste 1 is broken up to produce the dried combustible material 4 as pellet-shaped solid fuel smaller than 1 cm$^3$.

Herein, the solid fuel manufacturing method using the solid fuel manufacturing apparatus 10 of the first embodiment was investigated to check its significance. This check was conducted by a test 1 using wasted cabbages as a sample of the combustible waste 1 and a test 2 using decayed oranges as a sample of the combustible waste 1.

<Common Conditions in Test 1 and Test 2>
(1) A mixture weight ratio of combustible waste 1 and dehydrating liquid 2; 97:3
(2) Surface temperature of combustible waste 1 before mixing; 28° C.
(3) Drying time; 6 hours
(4) Analysis of moisture content percentage; a specialized agency measured the dried combustible material 4 every 1 hour by a moisture meter.
(5) Measurement of moisture content percentage; the samples were stirred for 5 minutes and measured by use of a heating-drying moisture meter (Model ML-50 by A&D Company Ltd.).

<Results of Test 1>
In the test 1, the moisture content percentage of the cabbage before mixing was 92%. The moisture content percentage of the dried combustible material 4 produced from the cabbage was 13.5% in 6 hours after the start of drying. The surface temperature of this dried combustible material 4 was 30.1° C. It was further determined that the dried combustible material 4 was obtained as solid fuel broken down into pellets each having a size nearly corresponding to one rice grain. As a result of analyzing the dried combustible material 4 in the test 1, an amount of heat generation of the dried combustible material 4 produced from the cabbage was 18800 J/g.

<Results of Test 2>
In the test 2, the moisture content percentage was 80.6%. The moisture content percentage of the dried combustible material 4 produced from the decayed orange was 21.4% in 6 hours after the start of drying. The surface temperature of this dried combustible material 4 was 26.1° C. It was further determined that the dried combustible material 4 was obtained as solid fuel broken into pellets each having a size of about 0.8 cm$^3$. As a result of analyzing the dried combustible material 4 in the test 2, an amount of heat generation of the dried combustible material 4 produced from the decayed orange was 19800 J/g.

In the tests 1 and 2, the dried combustible material 4 with a moisture content percentage of about 20% usable as solid fuel could be produced by a simple manner that a slight amount of the dehydrating liquid 2 is mixed into the combustible waste 1 containing moisture at a moisture content percentage of 80% or more and kneaded, and then the resultant mixture 3 is stirred for about 6 hours while the outside air AR at about 20° C. substantially corresponding to a room temperature is blown. Thus, it was confirmed that the solid fuel manufacturing method using the solid fuel manufacturing apparatus 10 has significance. In addition, in the course of producing the dried combustible material 4, the combustible waste 1 is not exposed to an atmosphere under high temperature close to 100° C., differently from that in the conventional solid fuel manufacturing apparatus, and thus does not generate foul odors.

The following explanation is given to operations and advantageous effects of the solid fuel manufacturing apparatus 10 and the solid fuel manufacturing method using this apparatus of the first embodiment configured as above.

The solid fuel manufacturing apparatus 10 includes the mixture producing device 10A to produce the mixture 3 by kneading the wet combustible waste 1 and the dehydrating liquid 2 acting to accelerate removal of moisture from the combustible waste 1, the rotary drum 30 configured to be cylindrical and rotatable and contain the mixture 3 in the internal space 30S, and the exhaust fan 41 for introducing outside air AR into the rotary drum 30.

The apparatus 10 further includes the exhaust opening 45 through which the exhaust air EG will be discharged, the motor 51 to rotate the rotary drum 30, the control board 60 to control motions of the motor 51, and the blades 72 to break up or fragment the mixture 3 contained in the internal space 30S. The dehydrating liquid 2 is a treatment agent made of an emulsion containing synthetic resin. The blades 72 are arranged along the inner peripheral wall 31 of the rotary drum 30 and configured to scoop the mixture 3 upward in the internal space 30S and allow the mixture 3 to freely fall from above in the internal space 30S as the rotary drum 30 rotates.

In the solid fuel manufacturing apparatus 10, therefore, the moisture contained in the combustible waste 1 is allowed to easily evaporate by the dehydrating liquid 2. If only the mixture 3 is stirred and exposed to the outside air AR of about 20° C., which is almost close to a room temperature, without heating the air to a high temperature, the dried combustible material 4 can be broken up into small pieces as solid fuel by the blades 72 and the rake 34. In the solid fuel manufacturing apparatus 10, in addition to simple configuration and structure, any system for a heating source is unnecessary to heat the combustible waste 1 in order to produce the dried combustible material 4 as solid fuel from the combustible waste 1, and hence any energy (fuel) does not need to be supplied to the heating source.

The solid fuel manufacturing apparatus 10 is therefore low in both the initial cost and the running cost as compared with the conventional solid fuel manufacturing apparatus. In addition, this apparatus 10 can produce the dried combustible material 4 from the combustible waste 1 effectively and in a short treatment time. No foul odors are not generated during production of the dried combustible material 4 and thus no deodorization means is necessary and also workability is good.

As well as in the public sewage sludge treatment system, particularly, in facilities such as food manufacturers and supermarkets, a lot of combustible waste which is organic waste such as sewage sludge generated during sewage treatment and food waste, is daily generated. To produce the dried mixture from such combustible waste, the solid fuel manufacturing apparatus 10 has a high treatment capacity to dry the combustible waste 1 of several tens to hundreds kg in a treatment time of a few hours, for example. In those facilities, the solid fuel manufacturing apparatus 10 can be suitable for making the combustible waste 1 into solid fuel.

According to the solid fuel manufacturing apparatus 10 of the first embodiment, therefore, it can provide superior effects that can remove the moisture contained in sludge which is the combustible waste 1 and produce the dried combustible material 4 which is solid fuel at low cost.

In the first embodiment, the blades 72 attached to the inner peripheral wall 31 of the rotary drum 30 are arranged in two or more places under the condition of at least different attachment angles or orientations in the axial direction AX and the circumferential direction CR of the rotary drum 30. Further, the load sensors 59 are arranged in positions to support the rotary drum 30. The control board 60 controls motions of the motor 51 based on the detection signals from the load sensors 59.

In the internal space 30S of the rotary drum 30, accordingly, the mixture 3 is uniformly stirred, so that the surface area of the mixture 3 exposed to the outside air AR introduced in the internal space 30S through the intake opening 33 is more increased, thereby easily accelerating evaporation of the moisture and breakup of the mixture 3.

In the first embodiment, the rotary drum 30 is a batch rotary drum and is useful in the solid fuel manufacturing apparatus 10 when a relatively small amount of combustible waste 1 is to be treated to produce solid fuel. Furthermore, the solid fuel manufacturing apparatus 10 is compact and thus low in facility cost.

In the first embodiment, the heat pump 46 is provided to raise the temperature of the outside air AR to be introduced by the exhaust fan 41 in a range of 20° C. or more but 30° C. or less when the temperature of the outside air AR is less than 20° C. Accordingly, even if the temperature of the outside air AR is less than 20° C. according to seasons or environments, it is possible to prevent generation of foul odors and efficiently evaporate the moisture contained in the mixture 3 in the atmosphere of the internal space 30S of the rotary drum 30.

In the first embodiment, since the scraper 47 is provided on the exhaust opening 45, when the outside air AR introduced by the exhaust fan 41 is to be blown in the internal space 30S of the rotary drum 30, it is possible to prevent a flow of the outside air AR from being interfered with the mixture 3 (or the dried combustible material 4) sticking to the entire mesh of the exhaust opening 45.

In the first embodiment, the solid fuel manufacturing apparatus 10 is installed in the interior space of the cargo container 20. Accordingly, when the cargo container 20 enclosing the solid fuel manufacturing apparatus 10 in the interior space is simply anchored in an installation place for the solid fuel manufacturing apparatus 10, installation of the solid fuel manufacturing apparatus 10 is completed. This installation work is thus easy.

In the first embodiment, the solid fuel manufacturing apparatus 10 is used to dry the moisture from the combustible waste 1, and break up the combustible waste 1 to produce the dried combustible material 4 as solid fuel broken into pellets each having a size smaller than 1 cm³. Accordingly, the dried combustible material 4 can be easily combusted. Further, the dried combustible material 4 can be used for wide purposes in any devices configured to burn solid fuel to generate heat.

In the first embodiment, the combustible waste 1 is any one of at least sewage sludge, food waste, animal waste, and vegetable waste. Thus, the combustible waste 1 from which the moisture is removed but in which a combustible component remains left can be utilized as effective fuel resource.

Second Embodiment

Figure 17:
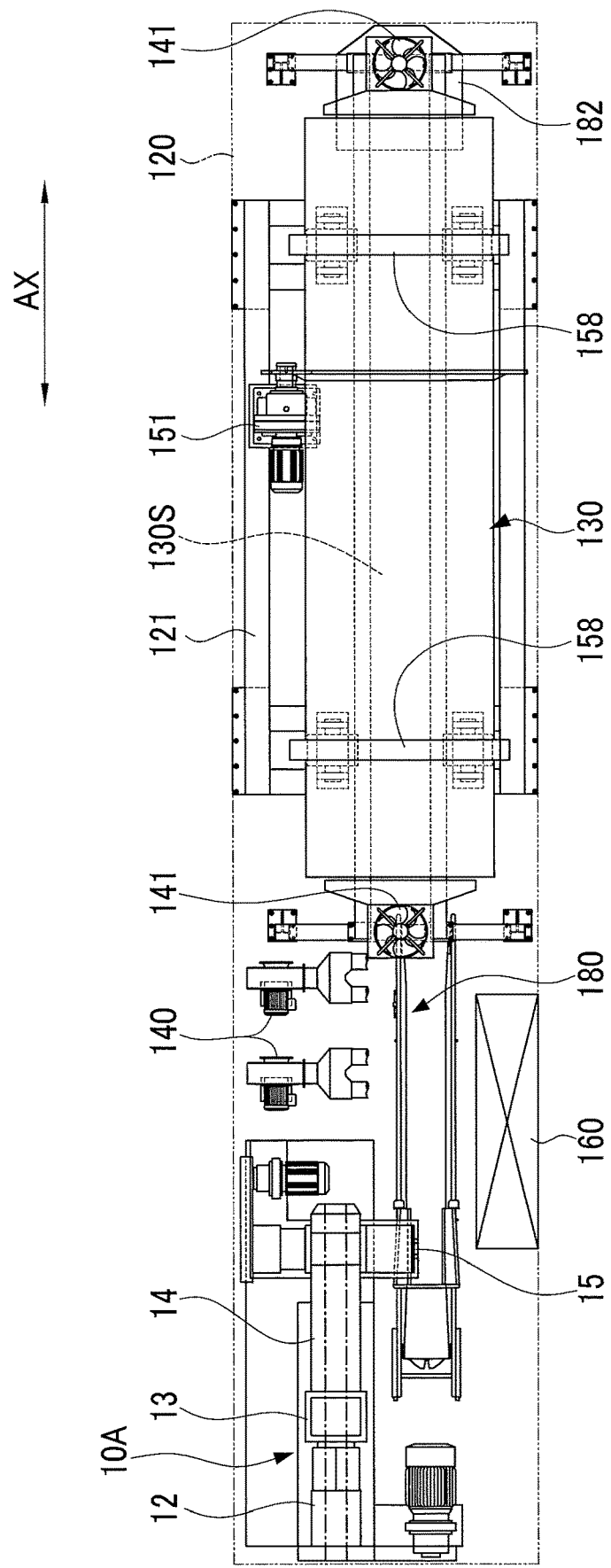
FIG. 17 is a plan view of the solid fuel manufacturing apparatus shown in FIG. 16.
Figure 18:
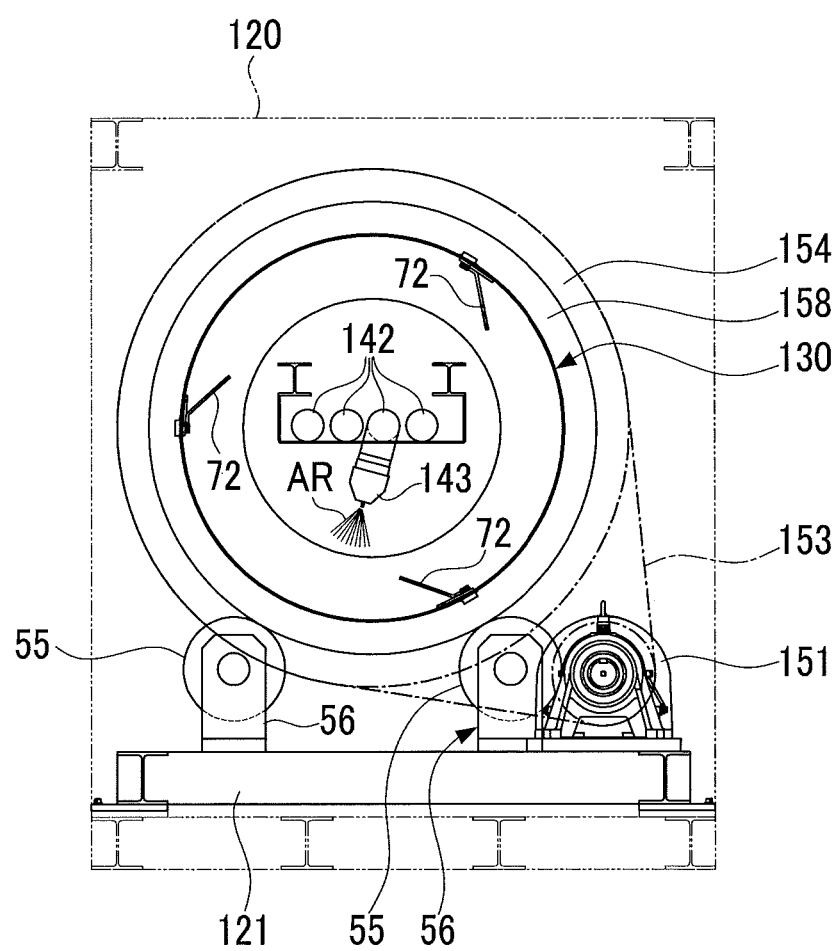
FIG. 18 is an explanatory view showing an inner state of a continuous drum taken along an arrow F-F in FIG. 16.

A solid fuel manufacturing apparatus 110 of a second embodiment will be explained referring to FIGS. 16 to 18.

Figure 16:
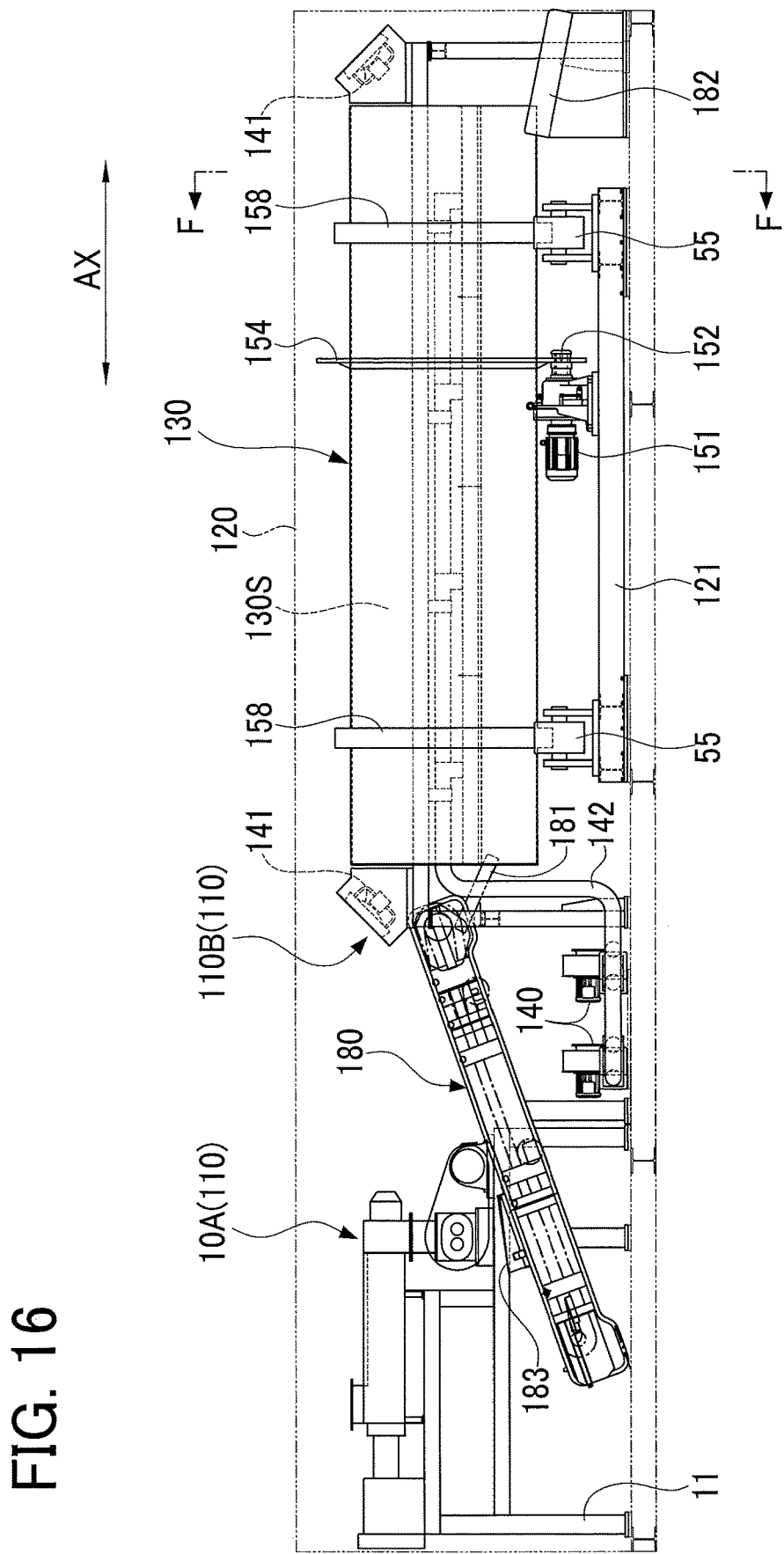
FIG. 16 is a front view showing a solid fuel manufacturing apparatus of a second embodiment.

FIG. 16 is a front view showing the solid fuel manufacturing apparatus 110 of the second embodiment. FIG. 17 is a plan view showing the solid fuel manufacturing apparatus 110 shown in FIG. 16. FIG. 18 is an explanatory view showing an inner state of a continuous rotary drum 130 taken along an arrow F-F in FIG. 16.

In the solid fuel manufacturing apparatus 10 of the first embodiment, the mixture forming means of the invention is exemplified as the rotary drum 30 of a batch treatment type. In the solid fuel manufacturing apparatus 110 of the second embodiment, the mixture forming means of the invention is exemplified as the rotary drum 130 of a continuous treatment type including a carry-in conveyer 180. Additionally, the second embodiment differs from the first embodiment mainly in the size of a cargo container for accommodating the solid fuel manufacturing apparatus 110, a rotation driving mechanism of the rotary drum 130, and others.

The remaining parts or components are identical to those of the first embodiment. Accordingly, similar or identical parts to those of the first embodiment are given the same reference signs as those of the first embodiment and are explained briefly or not explained repeatedly. The following explanation is made with a focus on differences from the first embodiment.

The solid fuel manufacturing apparatus 110 mainly consists of the mixture producing device 10A and a mixture drying device 110B as shown in FIG. 16. In the second embodiment, the solid fuel manufacturing apparatus 110 is designed to have a size allowing installation in an interior space (a compartment) of a cargo container 120 for transporting the apparatus 110 to a destination. To be concrete, the apparatus 110 is configured on the assumption that it will be installed in for example the interior space of a so-called 40 ft high-cube (a tall type) sea-cargo container (Inside dimension; Length: 12.030 m, Width: 2.350 m, and Height: 2.700 m) according to the ISO standards.

The solid fuel manufacturing apparatus 110 may be installed not only in the interior space of the cargo container 120 but alto on a floor of a building or plant without using the cargo container 120. In this case, the apparatus 110 does not need to be configured with the dimension suitable for the cargo container 120.

In the second embodiment, the rotary drum 130 is a rotary drum of a continuous treatment type, configured such that the mixture 3 to be treated is charged into an internal space 130S located on one side (a left side in FIG. 16) in the axial direction AX and is treated by passing through the internal space 130S in the axial direction AX, and then the treated mixture 3 (the dried combustible material 4) is discharged out through an exit of the internal space 130S located on the other side (a right side in FIG. 16).

The rotary drum 130 is supported by four driven rollers 55 rotatably axis-supported one each by the drum lower side supporting parts 56 provided in four places on a second frame 121. On an outer periphery of the rotary drum 130, roller track parts 158 are provided in two places. The driven rollers 55 are driven in pairs to rotate while each pair contacts with the corresponding one of the roller track parts 158, thereby holding and supporting the rotary drum 130 during rotation.

On the outer periphery of this rotary drum 130, there is provided a chain engagement part 154, like an eternal ring gear, intermittently formed with outer gear teeth engageable with a drive chain 153. A motor 151 is a drive source to rotate the rotary drum 130. A sprocket is connected to a motor output shaft 152. The drive chain 153 is wound over this sprocket and the chain engagement part 154. Accordingly, rotation of the motor output shaft 152 causes rotation of the rotary drum 130.

As another configuration, instead of using the above sprocket and drive chain 153, it may be arranged such that a drive gear (an external teeth gear) is provided on the motor output shaft 152 and a driven gear (an annular external teeth gear) is provided on the outer periphery of the rotary drum 130 in engagement with the drive gear, so that rotation of the motor 151 is transmitted to the driven gear through the drive gear to transmit the rotational force of the motor 151 to the rotary drum 130.

The control board 160 is used to control various operations of the motor 151 such as activation ON/OFF and rotation control by a sequencer. The control board 160 includes a microcomputer (not shown) having a known configuration such as a CPU, a ROM, and a RAM. The ROM and others store in advance for example a program of setting and changing the number of rotations of the rotary drum 130, changing the rotational direction, controlling inching motion of a rotary operation, and rotation and stoppage thereof based on a magnitude of load detected by a load sensor, a program of automatically setting and changing a flow amount of outside air AR to be supplied, and adjusting of air volume of the outside air AR, and other programs.

The control board 160, by loading the above programs in the CPU, can execute predetermined operations, for example, rotating of the rotary drum 130 and blowing of outside air AR under optimal operation conditions corresponding to the state of the mixture 3 charged in the internal space 130S, that is, volume, moisture content percentage, distribution state in the internal space 130S.

In the internal space 130S of the rotary drum 130, a plurality of (four in FIG. 18) air pipes 142 (intake means) are arranged in parallel along the axis direction AX and connected to a drying blower 140 (intake means). Each air pipe 142 is provided with a plurality of air blowing nozzles 143 (intake means) arranged at intervals of a predetermined pitch to supply a required amount of outside air AR from the nozzles 143 into the internal space 130S.

The air blowing nozzles 143 may be configured, for example, such that adjacent air pipes 142 are arranged in a staggered pattern, that the nozzle tips are oriented in different directions based on a fixed pattern rule, and that two or more kinds of air blowing nozzles 143 having different nozzle diameters are used. The exhaust fans 141 (exhaust means) are provided one each on an entrance side and an exit side of the internal space 130S of the rotary drum 130.

In the second embodiment, the carry-in conveyer 180 is placed in the solid fuel manufacturing apparatus 110. This conveyer 180 is a belt conveyer configured by a well known technique. Specifically, when the mixture 3 ejected from the extrusion section 15 of the mixture producing device 10A is supplied onto a mixture tray 183 placed on the belt, the conveyer 180 conveys, by rotation of the belt, the tray 183 on which a predetermined amount of mixture 3 is put to an uppermost position.

The mixture 3 of the predetermined amount put on the tray 183 is charged in a carry-in hopper 181 located on the entrance side of the internal space 130S of the rotary drum 130 and then is contained in the internal space 130S of the rotary drum 130. As the rotary drum 130 rotates, while the mixture 3 repeats complicated motions by being scooped up in the internal space 130S by the plurality of blades 72 and then made freely fall from above in the internal space 130S, the mixture 3 is moved forward in one way in the axial direction AX in the internal space 130S.

During this movement, the mixture 3 is dried and broken into small pieces, forming the dried combustible material 4, and is carried out onto a carry-out hopper 182 placed on the exit side of the internal space 130S. The solid fuel manufacturing apparatus 110 has a high treatment capacity of for example 700 kg/hour and thus can continuously produce the dried combustible material 4 from the mixture 3 intermittently charged therein.

Operations and advantageous effects of the solid fuel manufacturing apparatus 110 of the second embodiment will be explained. As with the solid fuel manufacturing apparatus 10 of the aforementioned first embodiment, the solid fuel manufacturing apparatus 110 of the second embodiment can also remove the moisture contained in sludge which is the combustible waste 1 in short time and produce the dried combustible material 4 which is solid fuel at low cost.

In the solid fuel manufacturing apparatus 110, furthermore, the rotary drum 130 is a rotary drum of a continuous treatment type and therefore is suitably used for a relatively large amount of combustible waste 1 to be treated to produce solid fuel. This apparatus 110 can produce the dried combustible material 4 from the mixture 3 with enhanced productivity.

Other operations and effects of the solid fuel manufacturing apparatus 110 are the same as those of the solid fuel manufacturing apparatus 10 of the first embodiment excepting the actions resulting from the batch rotary drum 30 in the solid fuel manufacturing apparatus 10 of the first embodiment. Thus, their explanations are omitted herein.

Third Embodiment

Figure 19:
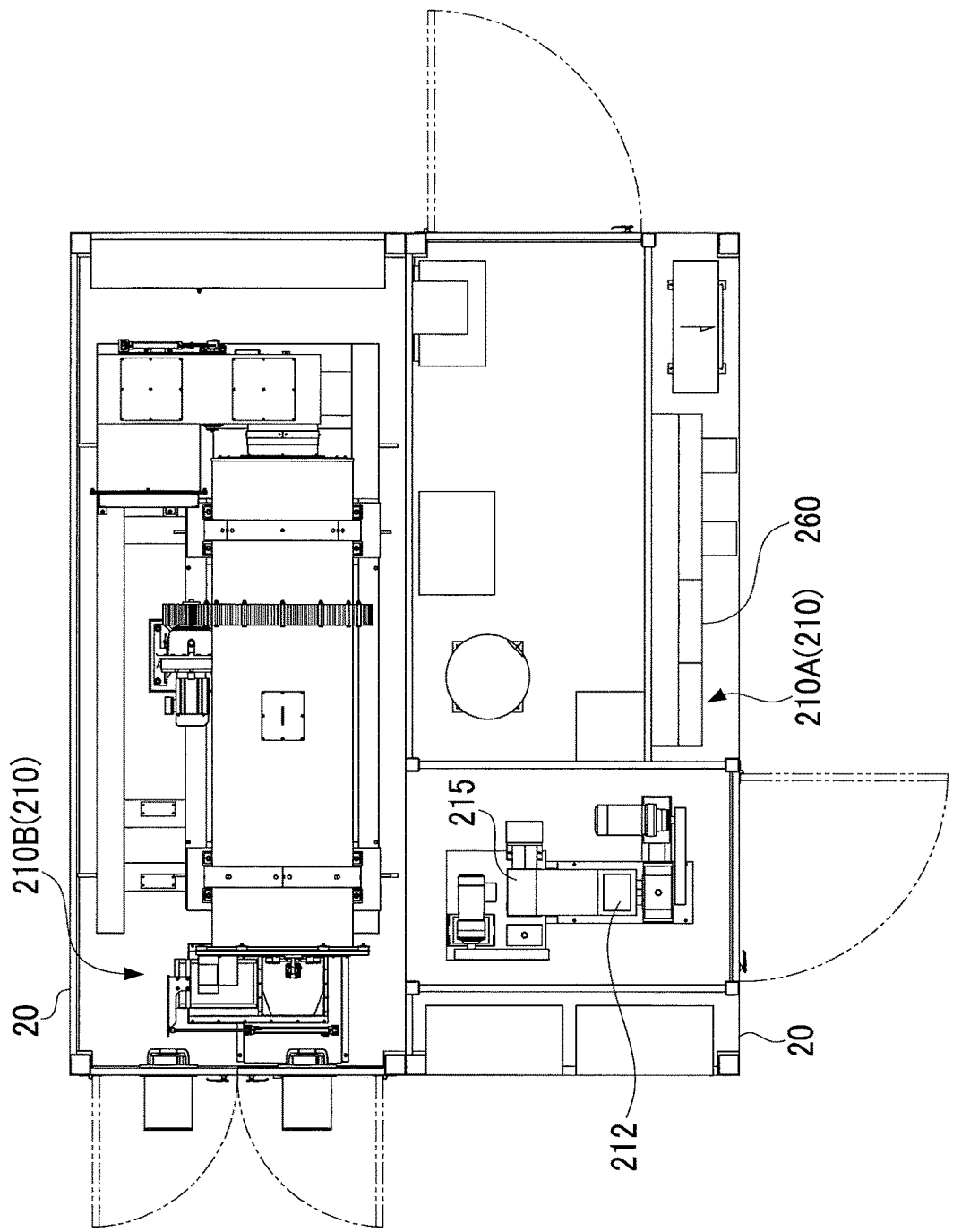
FIG. 19 is a plan view showing a solid fuel manufacturing apparatus in a third embodiment.
Figure 20:
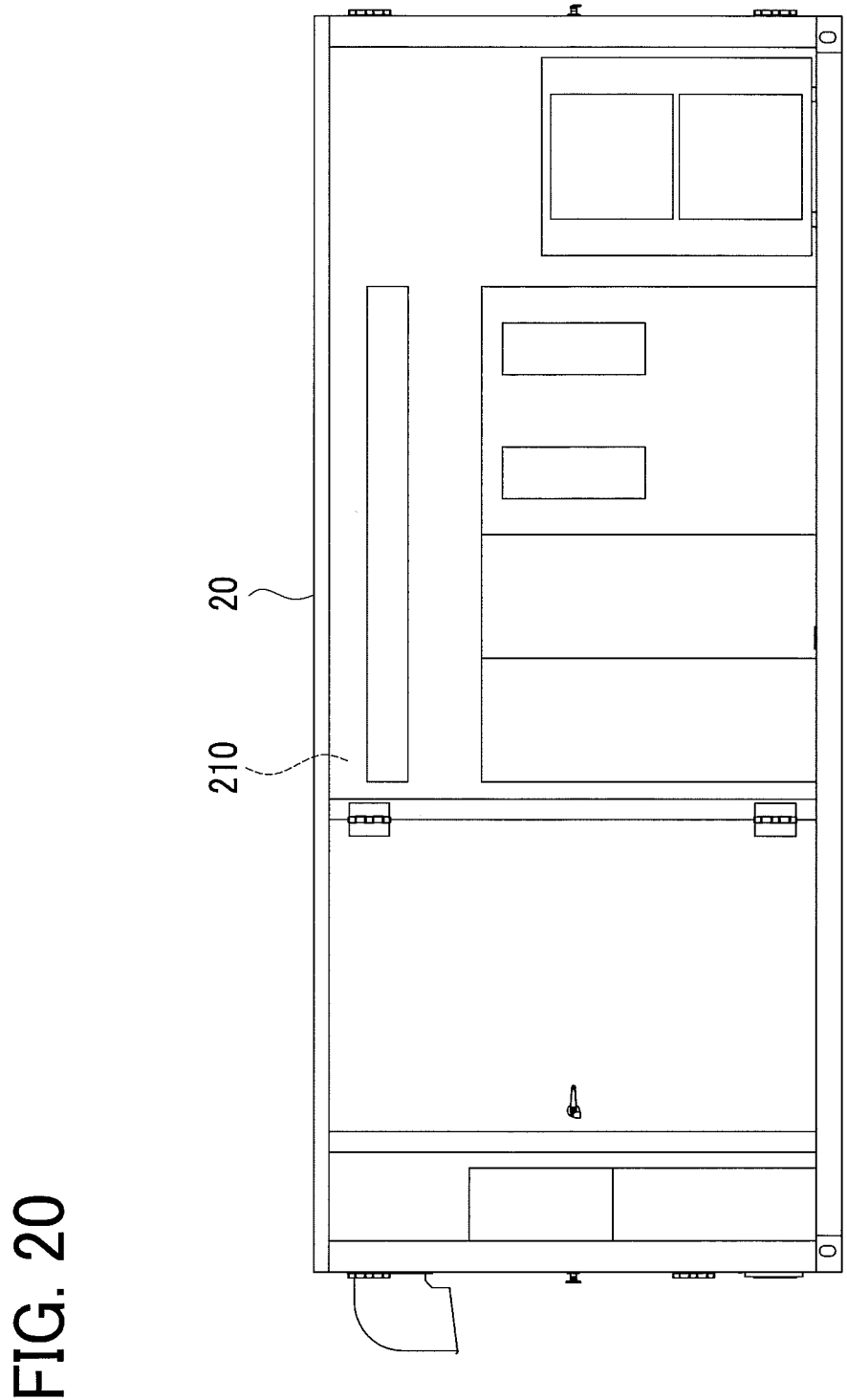
FIG. 20 is a front view of the solid fuel manufacturing apparatus shown in FIG. 19.
Figure 21:
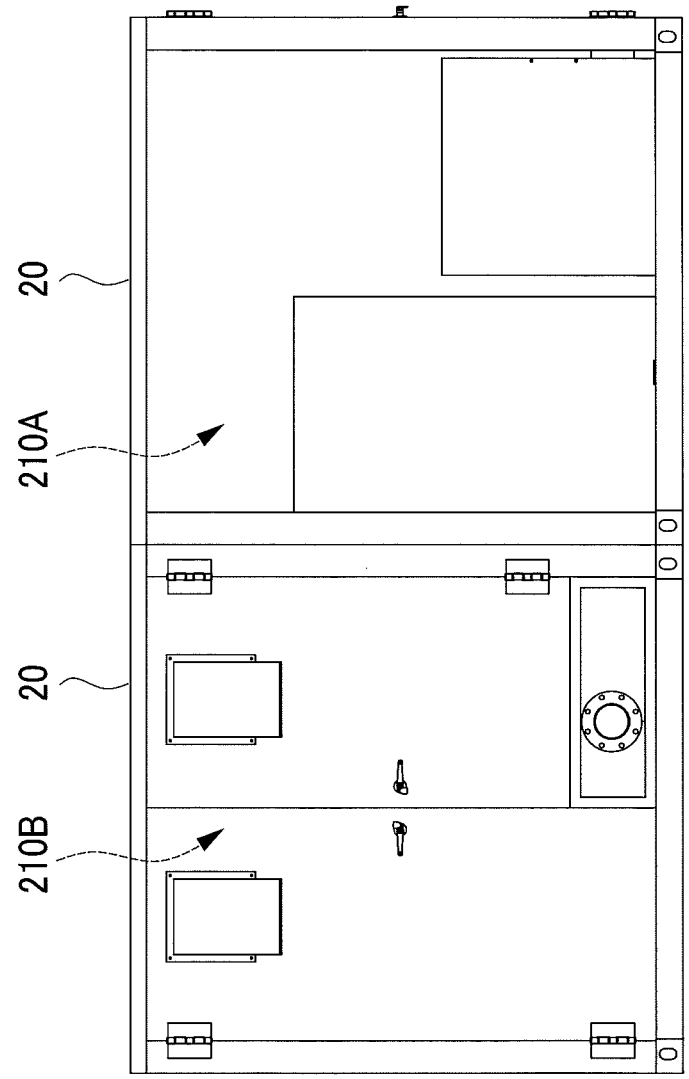
FIG. 21 is a left side view of the solid fuel manufacturing apparatus shown in FIG. 19.
Figure 22:
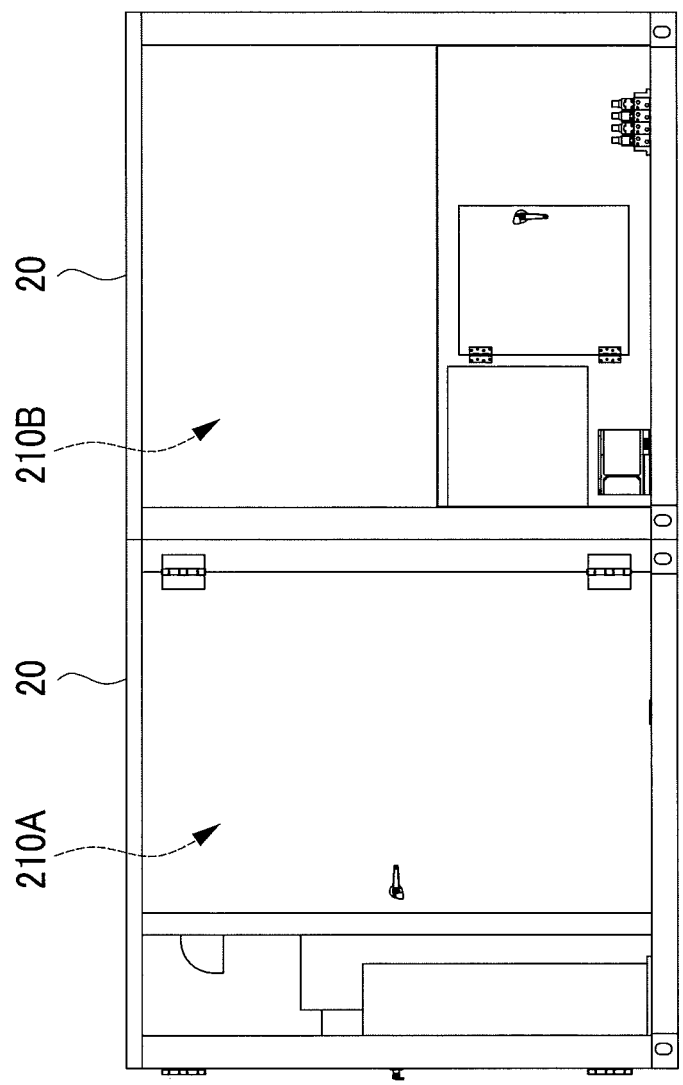
FIG. 22 is a right side view of the solid fuel manufacturing apparatus shown in FIG. 19.

A solid fuel manufacturing apparatus of a third embodiment will be explained below referring to FIGS. 19 to 30. FIG. 19 is a plan view showing a solid fuel manufacturing apparatus 230 of the third embodiment. FIG. 20 is a front view of the apparatus 230, and FIGS. 21 and 22 are left and right side views of the same respectively. In FIG. 19, for easy viewing, the heat pump 46 is not illustrated.

In the solid fuel manufacturing apparatus 10 of the first embodiment, both the mixture producing device 10A and the mixture drying device 10B are contained in a single cargo container 20. In the solid fuel manufacturing apparatus 210 of the third embodiment, a mixture producing device 210A and a mixture drying device 210B are separately contained in two cargo containers 20 arranged in parallel. The third embodiment mainly differs from the first embodiment in the addition of stirring screws 271, the shape of blades 272, the rotation drive structure of a rotary drum 230, the attachment configuration of an exhaust fan 241, the layout of devices constituting the entire solid fuel manufacturing apparatus 210, and others.

Other parts or features such as the method of drying the mixture 3 and provision of the heat pump 46 (heating means) are the same as those of the first embodiment. Accordingly, similar or identical parts or components to those of the first embodiment are given the same reference signs as those of the first embodiment and are explained briefly or not explained repeatedly. The following explanation is made with a focus on differences from the first embodiment.

As shown in FIG. 19, the mixture producing device 210A is accommodated together with a control board 260 in a horizontal posture in one of the cargo containers 20. The cargo containers 20 are so-called 20 ft containers according to the ISO standards. The mixture producing device 210A is a device to produce the mixture 3 by kneading the wet combustible waste 1 and the dehydrating liquid 2 (dehydrating agent) to accelerate removal of the moisture from the combustible waste 1, and is operated by operation and control of the control board 260.

The mixture producing device 210A includes, on the first frame, a raw-material charge port 212 through which the combustible waste 1 which is a raw material for solid fuel is charged, a liquid inlet (not shown) through which the dehydrating liquid 2 is poured, and an extrusion section 215 to eject the mixture 3 prepared by kneading the combustible waste 1 and the dehydrating liquid 2 to the outside.

Figure 23:
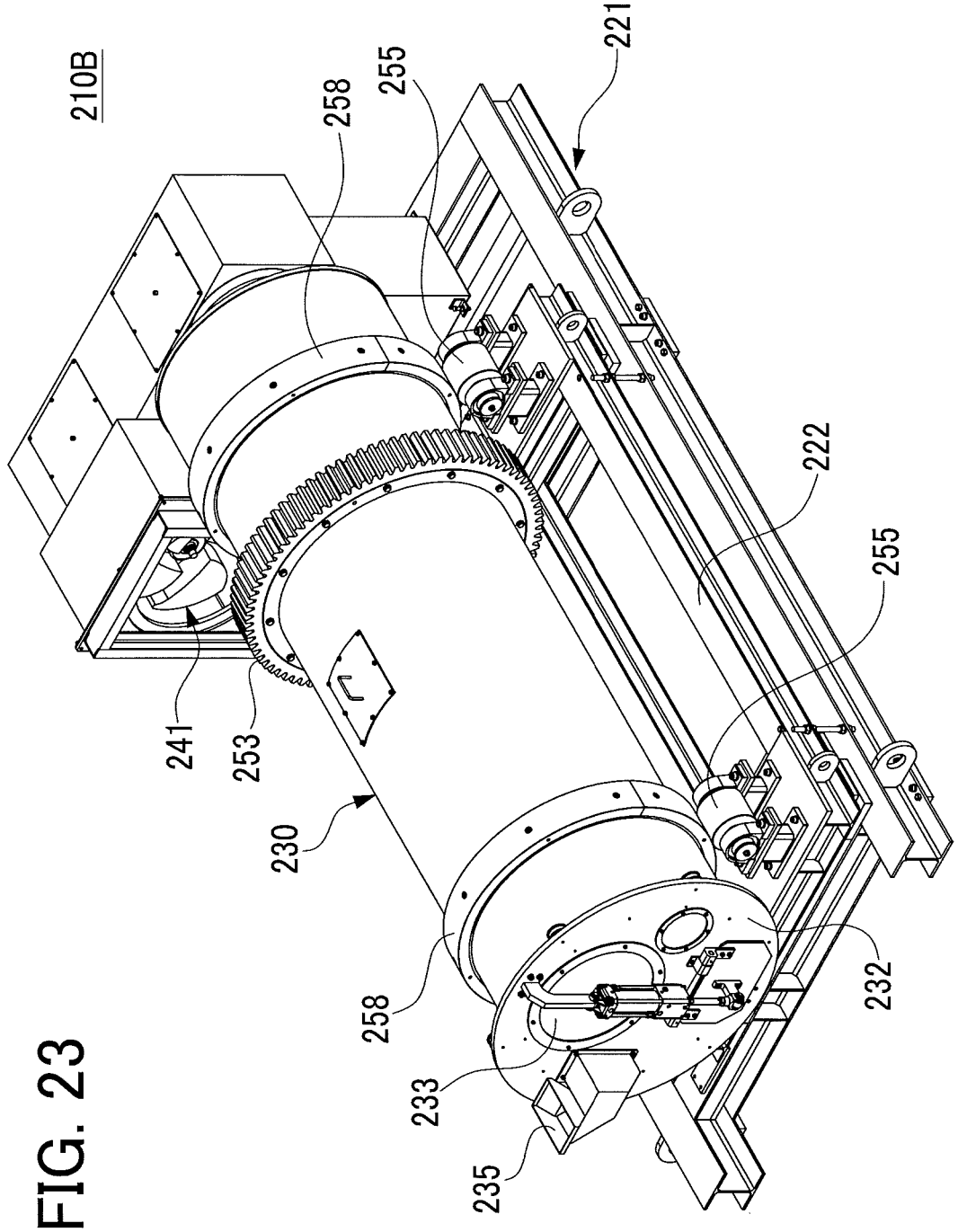
FIG. 23 is a perspective view of a mixture drying device of the solid fuel manufacturing apparatus shown in FIG. 19.
Figure 24:
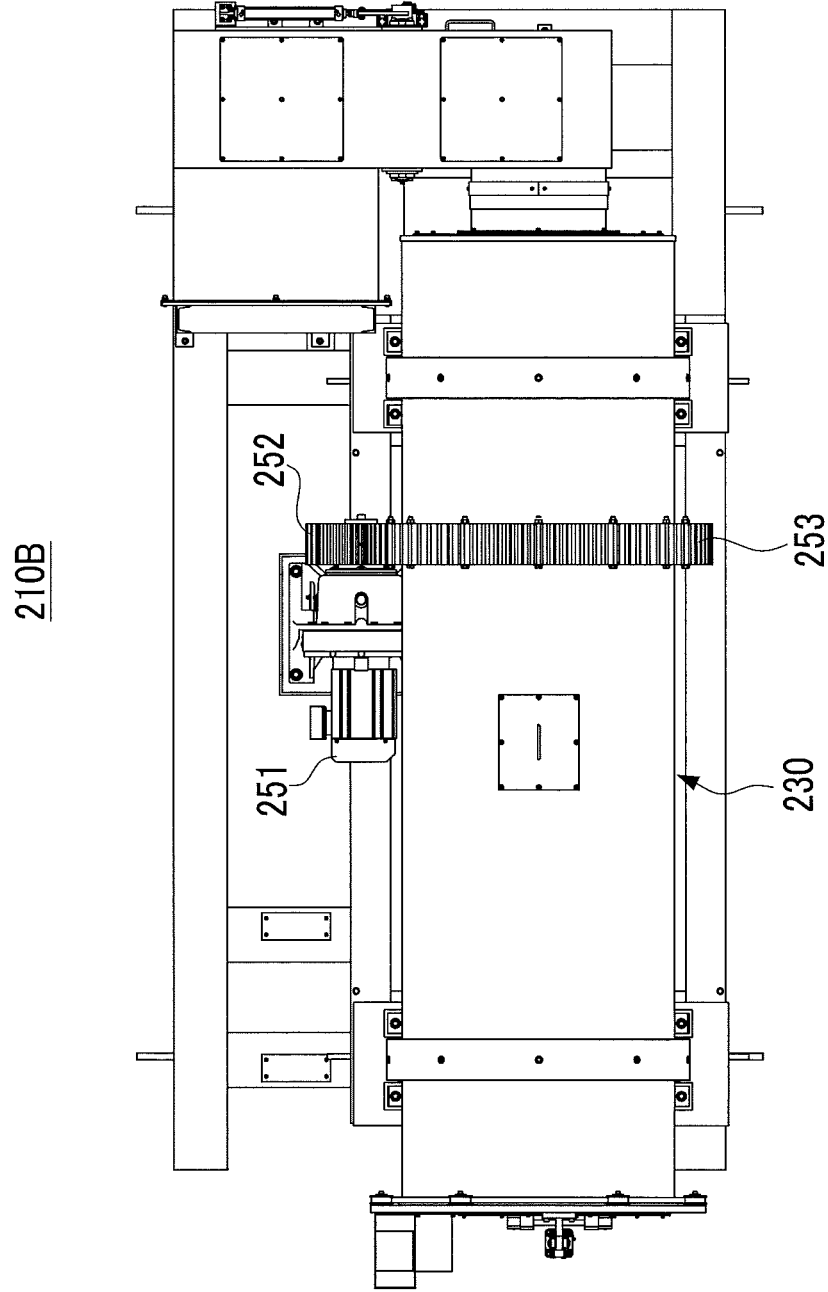
FIG. 24 is a plan view of the mixture drying device shown in FIG. 23.
Figure 25:
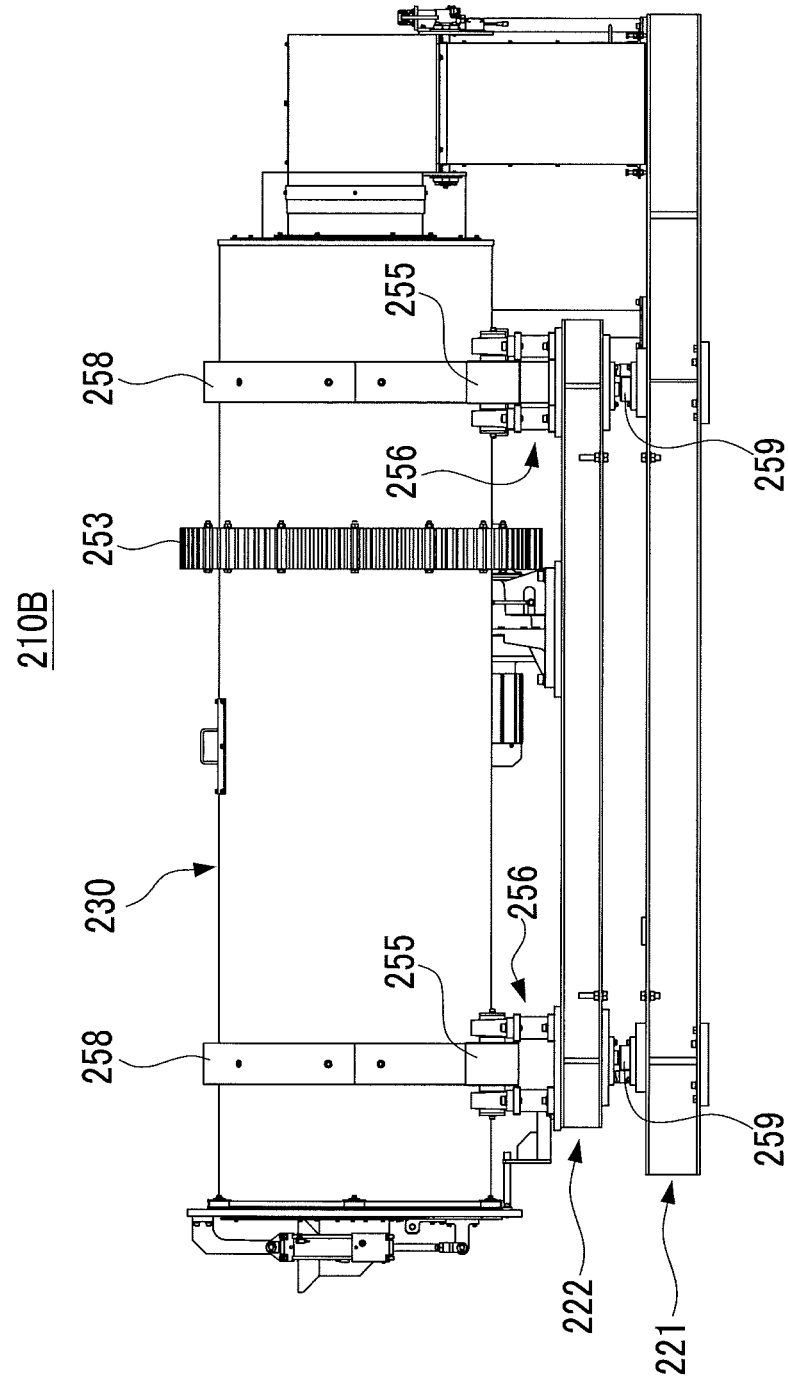
FIG. 25 is a front view of the mixture drying device shown in FIG. 23.
Figure 26:
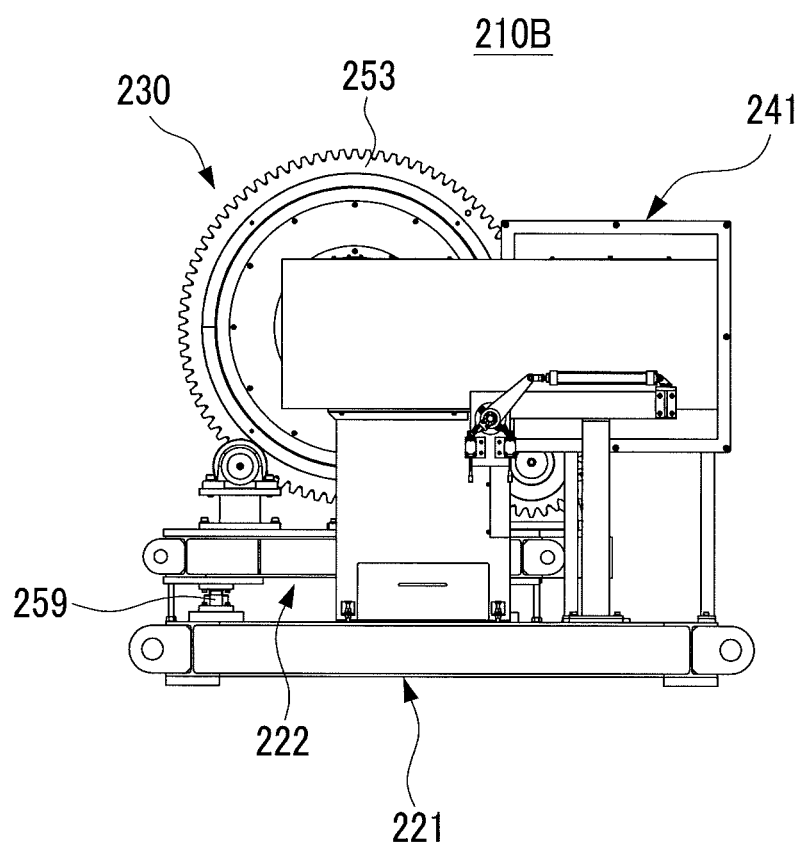
FIG. 26 is a right side view of the mixture drying device shown in FIG. 25.

FIG. 23 is a perspective view of the mixture drying device 210B of the solid fuel manufacturing apparatus 210 shown in FIG. 19. FIG. 24 is a plan view of the mixture drying device 210B. FIG. 25 is a front view and FIG. 26 is a right side view of the same. In one of the cargo containers 20, the mixture drying device 210B is accommodated. The mixture drying device 210B includes the rotary drum 230, the exhaust fan 241, and others.

The rotary drum 230 is a cylindrical, rotatable, batch type drum to contain the mixture 3 in an internal space 230S (see FIG. 30) and treat the mixture 3 by an amount charged in the internal space 230S. This drum 230 is designed to be longer in total length and larger in volume than the rotary drum 30 of the first embodiment. On a third frame 222, four drum lower side supporting parts 256 are fixedly provided. The rotary drum 230 is supported by four driven rollers 255 rotatably axis-supported by the drum lower side supporting parts 256, and in contact with two roller track parts 258 formed on the outer periphery of the rotary drum 230.

On the outer periphery of the rotary drum 230 positioned between the two roller track parts 258, there is a provided driven gear 253 which is an external ring gear. A drive gear 252 is attached on the output shaft of the motor 251 and is engaged with the driven gear 253 to transmit the rotational force of the motor 251 to the driven gear 253, thereby causing the rotary drum 230 to rotate.

The exhaust fan 241 and others are mounted on the second frame 221. Between this second frame 221 and the third frame 222, four load sensors 259 are arranged one each under the drum lower side supporting parts 256. The four load sensors 259 detect the loads acting on predetermined sites (e.g., a rotary shaft of each driven roller 255 or a bearing thereof) of the corresponding drum lower side supporting parts 256 among the loads on the entire rotary drum 230 including the mixture 3 contained in the internal space 230S.

The load sensors 259 are electrically connected to the control board 260 and output the detection signals to the control board 260. Specifically, upon receipt of the detection signals from the load sensors 259 representing that the mixture 3 is unevenly distributed to one side in the internal space 230S of the rotary drum 230, causing the gravity center of the entire rotary drum 230 to shift toward a door 232 or an opposite side in a longitudinal direction (a lower left to upper right direction in FIG. 23) of the rotary drum 230, the control board 260 reverses the rotation direction of the rotary drum 230 to return the gravity center of the entire rotary drum 230 to an original position and controls the rotation of the drum 230 to prevent the mixture 3 from staying in the one-sided position.

Figure 27:
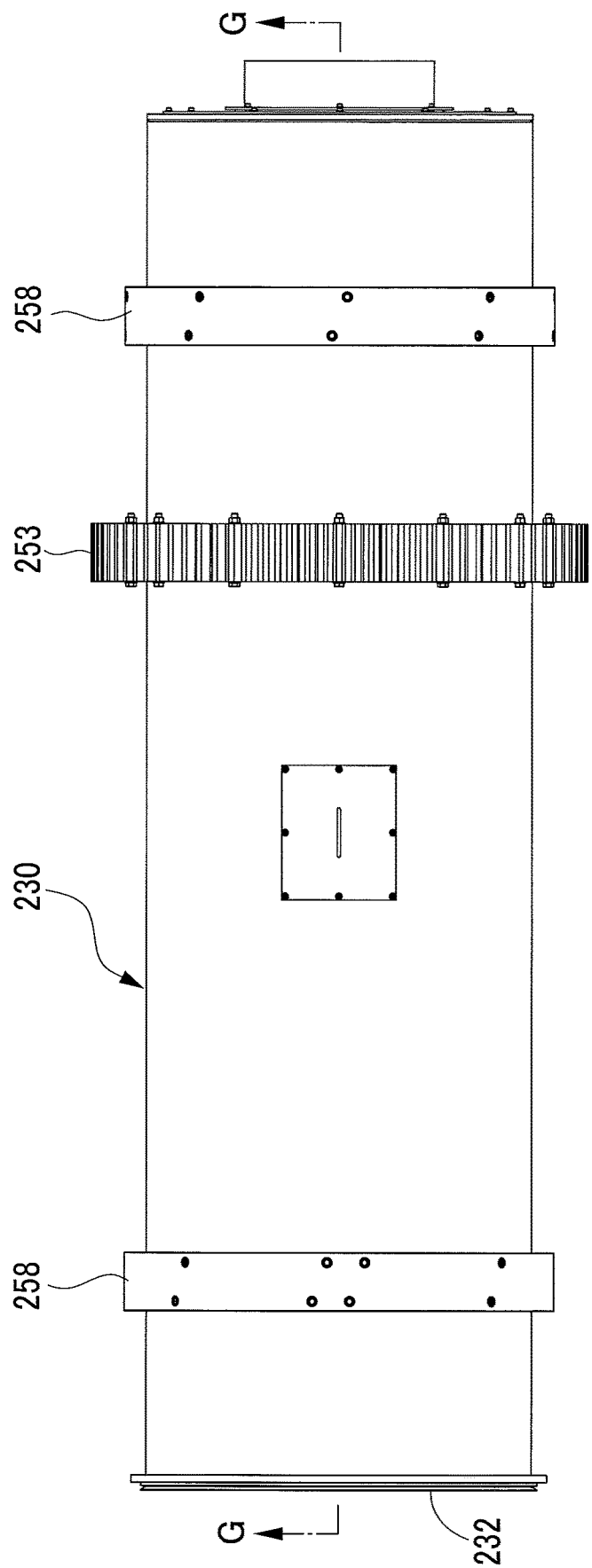
FIG. 27 is a plan view of a rotary drum of the mixture drying device shown in FIG. 23.
Figure 28:
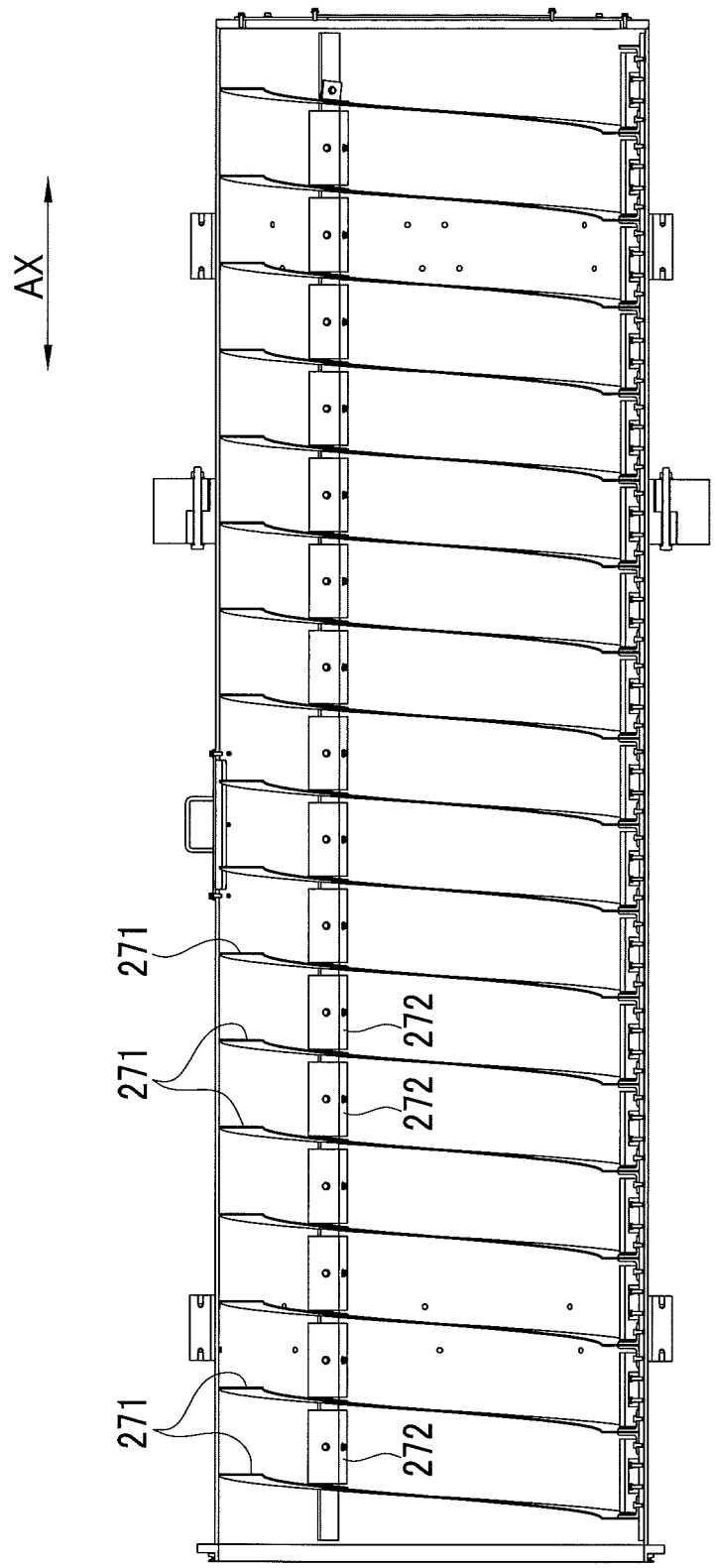
FIG. 28 is a view showing an inner state of the rotary drum taken along an arrow G-G in FIG. 27 and explaining attachment positions of stirring screws and blades.
Figure 29:
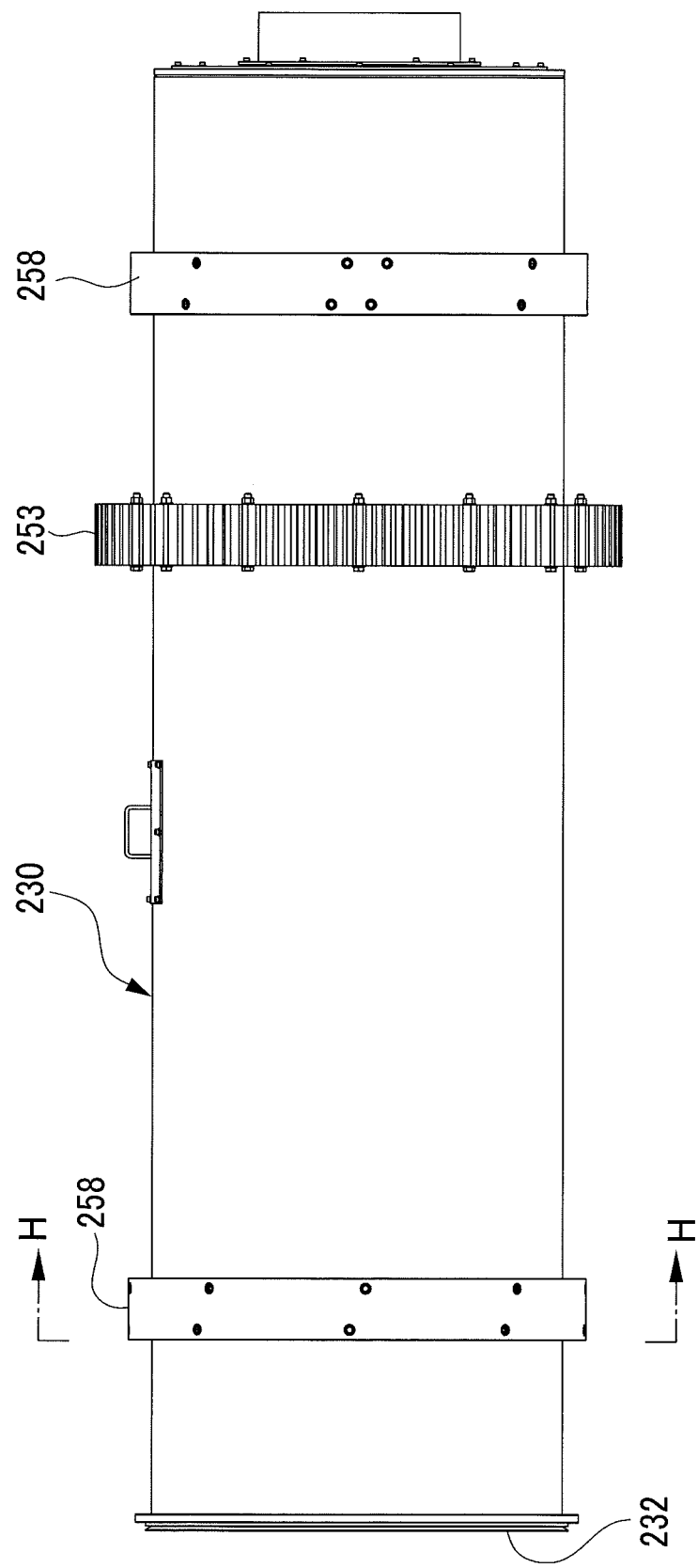
FIG. 29 is a front view of the rotary drum of the mixture drying device shown in FIG. 23.
Figure 30:
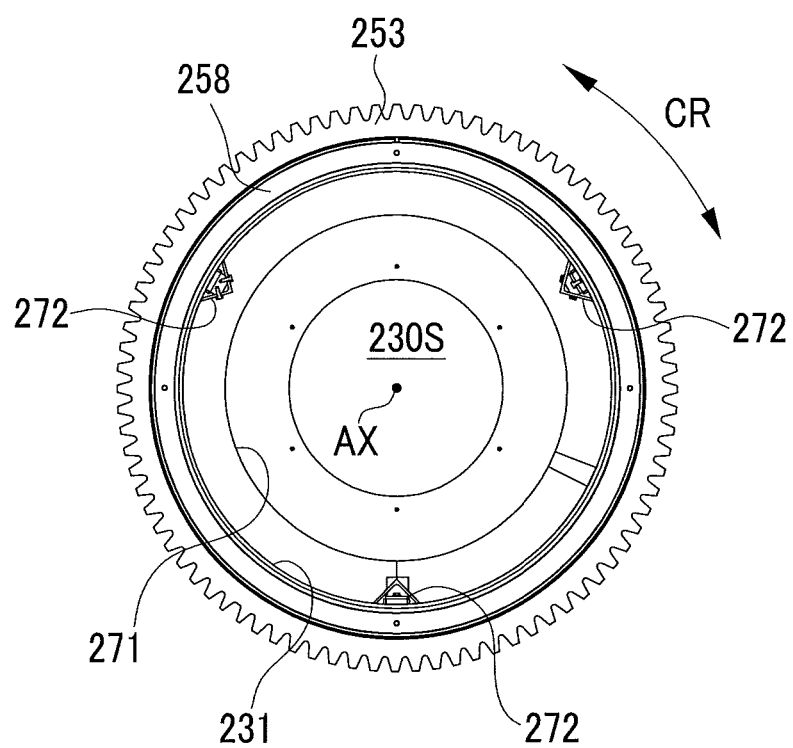
FIG. 30 is a view showing an inner state of the rotary drum taken along an arrow H-H in FIG. 29 and explaining attachment positions of a stirring screw and a blade.

FIG. 27 is a plan view showing the rotary drum 230 of the mixture drying device 210B shown in FIG. 23. FIG. 28 shows an inner state of the rotary drum 230 taken along an arrow G-G in FIG. 27. FIG. 29 is a front view of the rotary drum 230 of the mixture drying device 210B shown in FIG. 23. FIG. 30 shows an inner state of the rotary drum 230 taken along an arrow H-H in FIG. 29.

In the third embodiment, as shown in FIGS. 28 and 30, stirring screws 271 are provided in the internal space 230S of the rotary drum 230. The screws 271 are made of plates radially inward extending vertically to a normal direction of the rotary drum 230 over a range of the total length of the rotary drum 230 and spirally extending along the circumferential direction CR of an inner peripheral wall 231 at predetermined pitches in the axial direction AX. In each interval between the screws 271, per one circumference of the rotary drum 230, three blades 272 are arranged at equal angles of 120° in the circumferential direction CR of the rotary drum 230. The attachment positions of the blades 272, the number of attached blades 272, the intervals of blades 272 arranged in the circumferential direction CR are not limited to those in the third embodiment and may be appropriately changed according to the property of the mixture 3 to be dried.

The blades 272 are arranged, as members for breaking up the mixture 3 contained in the internal space 230S of the rotary drum 230, along the inner peripheral wall 231 of the rotary drum 230 and configured to scoop the mixture 3 (or the dried combustible material 4) upward in the internal space 230S and allow the mixture 3 (or the dried combustible material 4) to freely fall from above in the internal space 230S as the rotary drum 230 rotates. To be concrete, in the third embodiment, each blade 272 is made of a plate material bent at an angle of 90° between two sides by bending.

The operations and advantageous effects of the solid fuel manufacturing apparatus 210 of the third embodiment will be explained. As with the aforementioned solid fuel manufacturing apparatuses 10 and 110 of the first and second embodiments, the solid fuel manufacturing apparatus 210 of the third embodiment can also remove moisture contained in the sludge in short time, which is the combustible waste 1, to produce the dried combustible material 4 which is solid fuel at low cost.

Other operations and advantageous effects of the solid fuel manufacturing apparatus 210 are similar to those of the solid fuel manufacturing apparatus 10 of the first embodiment excepting the shapes, attachment patterns, and attachment positions of the blades 72 attached to the inner peripheral wall 31 of the rotary drum 30 in the solid fuel manufacturing apparatus 10 of the first embodiment. Thus, their explanations are not omitted.

Fourth Embodiment

Figure 31:
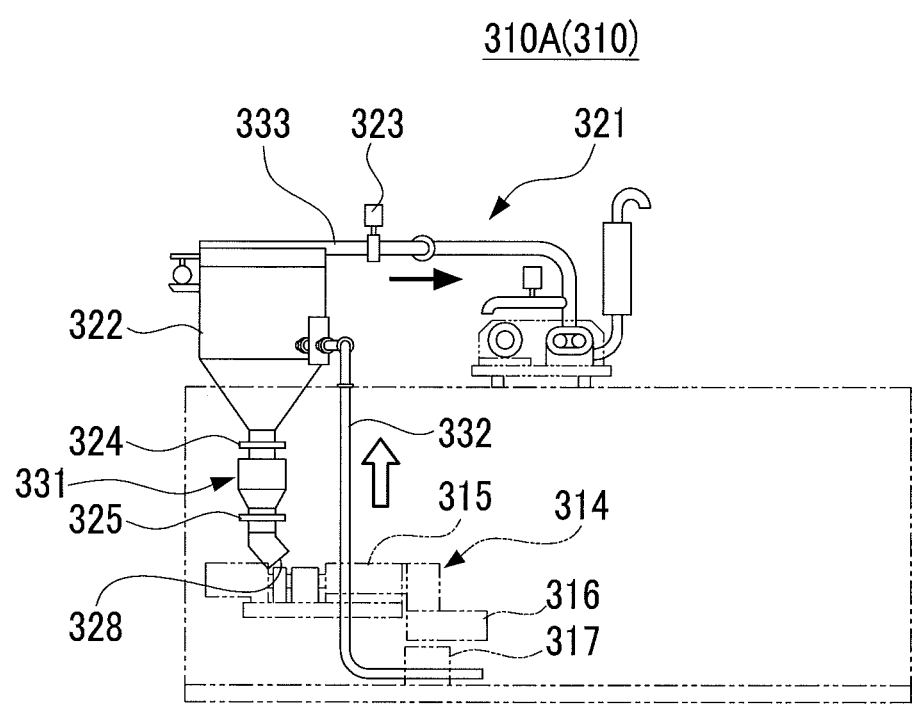
FIG. 31 is a side view showing a mixture producing device of a solid fuel manufacturing apparatus in a fourth embodiment.
Figure 32:
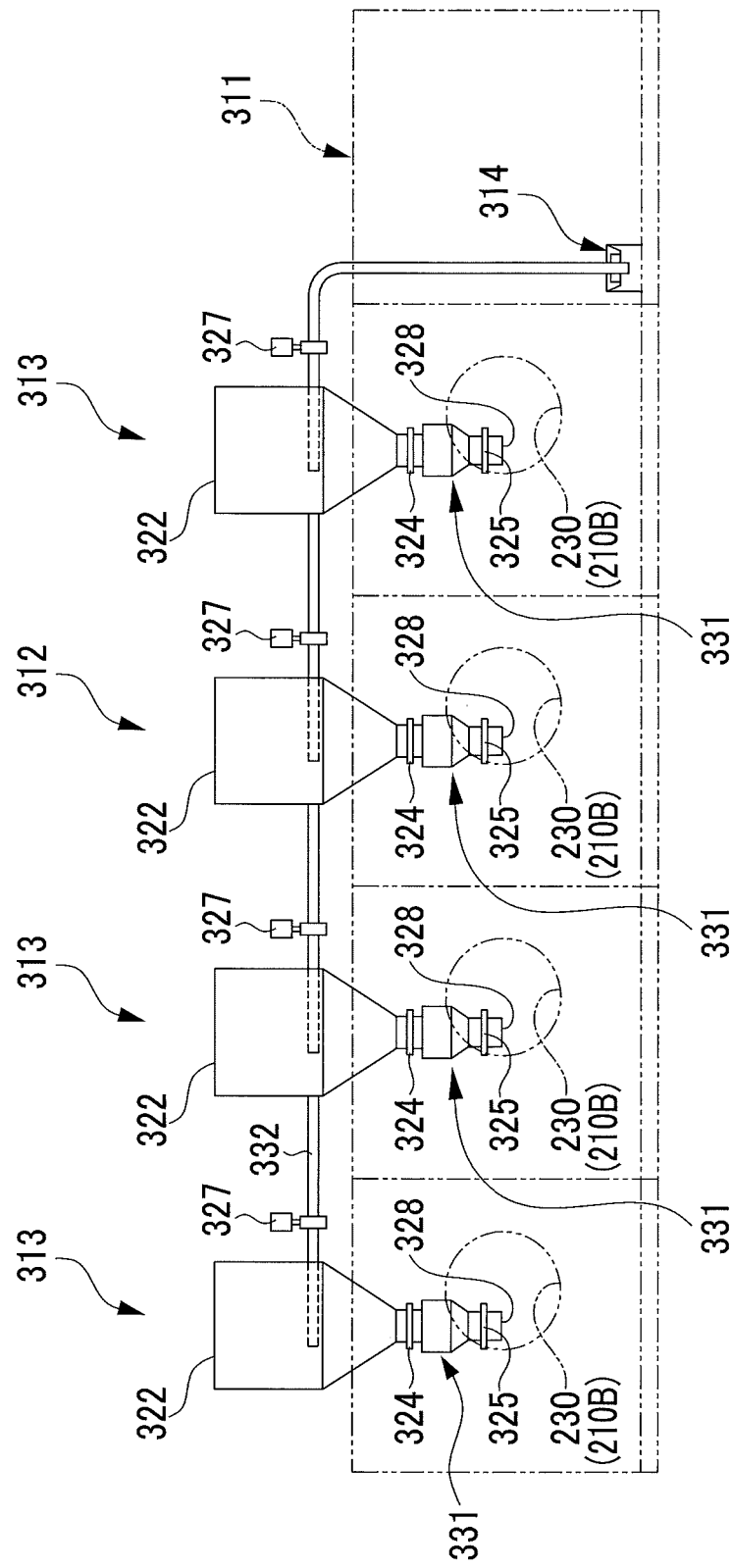
FIG. 32 is a front view of the mixture producing device shown in FIG. 31.

A solid fuel manufacturing apparatus of a fourth embodiment will be explained below referring to FIGS. 23, 31 to 33. FIG. 31 is a side view of a mixture producing device 310A of a solid fuel manufacturing apparatus 310 of the fourth embodiment. FIG. 32 is a front view and FIG. 33 is a plan view of the same.

The solid fuel manufacturing apparatus 310 of the fourth embodiment is different in the configuration of the mixture producing device 310A from the mixture producing device 210A of the solid fuel manufacturing apparatus 210 of the third embodiment, but the mixture drying device of the fourth embodiment is similar in configuration to the mixture drying device 210B of the third embodiment. Accordingly, similar or identical parts or components to those in the third embodiment are given the same reference signs as those in the third embodiment and are explained briefly or not explained repeatedly. The following explanation is made with a focus on differences from the third embodiment.

Figure 33:
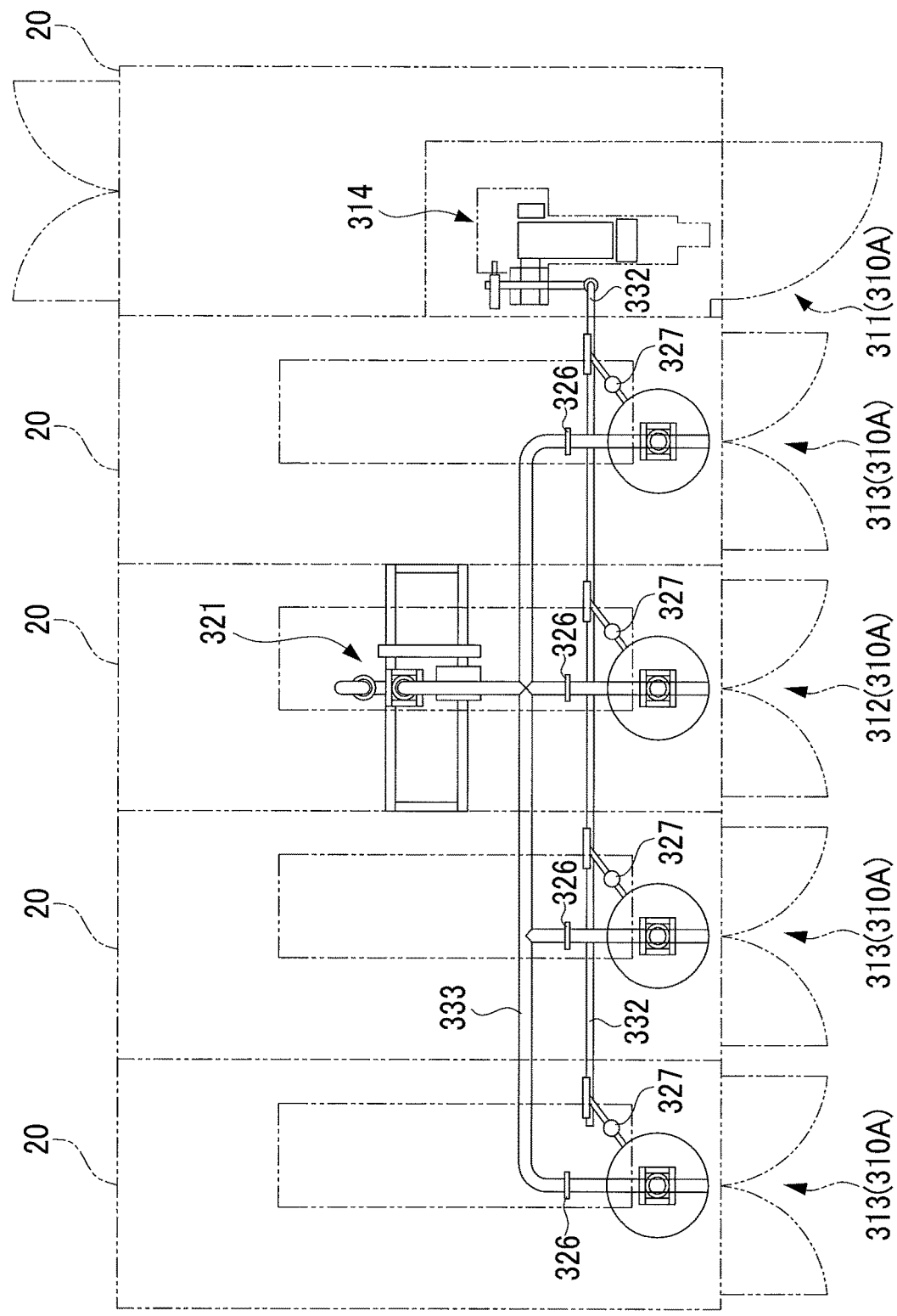
FIG. 33 is a plan view of the mixture producing device shown in FIG. 31.

In the solid fuel manufacturing apparatus 310, the mixture producing device 310A consists of a single kneading unit 311, a single mixture supplying main unit 312, and three mixture supplying sub-units 313 as shown in FIG. 33. These total five units are contained one each in so-called 20 ft cargo containers 20 in one-to-one correspondence with the units. These five cargo containers 20 are arranged in parallel lines.

The mixture supplying main unit 312 is disposed as a center line, and the kneading unit 311 is disposed on one side of the main unit 312 by interposing the mixture supplying sub-unit 313 therebetween. On the other side of the main unit 312, the two sub-units 313 are arranged side by side.

The kneading unit 311 includes a kneading section 314. In this kneading section 314, the combustible waste 1 is charged in a raw-material charge port 315 and the dehydrating liquid 2 (see FIG. 14) is poured in a liquid inlet not shown to be mixed with the combustible waste 1. The mixture 3 prepared by mixing the combustible waste 1 and the dehydrating liquid 2 is fed under pressure by a raw material ejection section 316. Thus, the mixture 3 broken into small pieces each having a thickness of about 10 mm in diameter is dropped and supplied from the raw material ejection section 316 to a raw material hopper 317.

In the third embodiment, the raw material hopper 317 is configured for example to include, not illustrated, a single port having a diameter of about 200 mm on an input side and a plurality of ports formed of small pipes each having a diameter of about 10 mm on an output side. Accordingly, when the mixture 3 is passing under pressure through the small pipes of the raw material ejection section 316, the mixture 3 is subjected to friction with the inner wall of each small pipe and thus is easily broken up by the frictional heat.

Each of the main unit 312 and the sub-units 313 is provided with a suction chamber 322 connected, through a first valve 324 and a second valve 325, to a mixture charge pipe 331 having an ejection port 328 at a distal end. The ejection port 328 is placed on a side close to the drum openable door 232 of the rotary drum 230 of the mixture drying device 210B and just above the mixture charge port 235 in which the mixture 3 is to be charged into the internal space 230S (see FIG. 23 and others).

The mixture feed pipe 332 connected to the raw material hopper 317 is connected in parallel to each of four suction chambers 322 through openable gates 327. Each gate 327 is a valve to block or allow the movement of the broken mixture 3 in the pipe 332.

The main unit 312 includes a suction pump 321 to suck air and is electrically connected to the control board 260 (see FIG. 19). The suction pump 321 is connected in parallel to each of four suction chambers 322 through an air pipe 333 connected in series with an air changeover valve 323 and third valves 326. The suction pump 321 sucks the air from the inside of the air pipe 333 to discharge the air in a direction indicated by a black arrow in FIG. 31.

A process of charging the mixture 3 prepared in the mixture producing devices 310A into the internal spaces 230S of the rotary drums 230 of the mixture drying devices 210B will be explained below. Firstly, the mixture 3 broken up into small pieces in the kneading section 314 is supplied to the raw material hopper 317. The mixture 3 supplied to the hopper 317 is sucked in a direction indicated by a white arrow in FIG. 31 by the suction pump 321 while the first valves 324 are closed, and then fed into the suction chambers 322.

At that time, the gates 327 of the suction chambers 322 of the three sub-units 313, excepting the main unit 312, are opened/closed as needed to charge the mixture 3 from the sub-unit(s) 313 into the internal space(s) 230S of the rotary drum(s) 230 of the corresponding mixture drying device(s) 210B. Similarly, the third valves 326 are opened/closed.

Specifically, when the sub-unit(s) 313 is to be activated to charge the mixture 3 into the internal space(s) 230S of the rotary drum(s) 230 of the mixture drying device(s) 210B, the openable gate(s) 327 and the third valve(s) 326 are opened. On the other hand, when the sub-unit(s) 313 is not to be activated to charge the mixture 3 into the internal space(s) 230S of the rotary drum(s) 230 of the mixture drying device(s) 210B, the gate(s) 327 and the third valve(s) 326 are closed.

The mixture 3 sucked by the suction pump 321 is fed, under friction with the inner wall of the air pipe 333, to the suction chamber 322 of the main unit 312 and the suction chambers 322 of the three sub-units 313, and stored in the four suction chambers 322. At that time, the mixture 3 is exposed to the air being sucked by the suction pump 321 and also to frictional heat caused by contact with the inner wall of the feed pipe 332 during delivery. Thus, during delivery, the moisture contained in the mixture 3 is removed by about 10% as compared with the percentage of moisture content of the combustible waste 1 before charged in the kneading section 314.

When the mixture 3 with the moisture content percentage reduced by about 10% is stored in a predetermined amount in the suction chamber(s) 322, the suction pump 321 is stopped sucking, so that the internal pressure of the air pipe 333 becomes atmospheric pressure. After the openable gate 327 is closed, the first valve 324 is opened and simultaneously the second valve 325 is opened. Accordingly, the mixture 3 stored in the suction chamber 322 is allowed to free-fall from the ejection port 328 through the charge pipe 331 into the charge port 235 of the rotary drum 230 of the mixture drying device 210B, and thus the mixture 3 is charged into the internal space 230S In the solid fuel manufacturing apparatus 310, charging of the mixture 3 into the internal space(s) 230S of the rotary drum(s) 230 of the mixture drying device(s) 210B and sucking and storing of the mixture 3 by the suction pump 321 are alternately, intermittently repeated. Accordingly, when a predetermined amount of the mixture 3 is charged into the internal space 230S of the rotary drum 230, the second valve 325 remains opened but the first valve 324 is closed. Further, the gate 327 is opened. A series of the above operations is repeatedly performed.

As with the solid fuel manufacturing apparatus 210 of the aforementioned third embodiment, the solid fuel manufacturing apparatus 310 of the fourth embodiment can also dehydrate the sewage sludge which is the combustible waste 1 in short time and produce the dried combustible material 4 as solid fuel at low cost.

The other operations and effects of the solid fuel manufacturing apparatus 310 are the same as those of the solid fuel manufacturing apparatus 210 of the third embodiment. Their explanations are thus omitted.

The present invention is explained in the first to fourth embodiments but is not limited thereto. The invention may be embodied in other specific forms without departing from the essential characteristics thereof.

(1) In the first to fourth embodiments, for instance, the combustible waste 1 is sewage sludge. However, the combustible waste is not limited to those in the embodiments and may be any materials as long as they contain moisture and combustible components.

(2) In the first and second embodiments, the blades 72 shaped and arranged as shown in FIGS. 6 to 9 are exemplified as the breaking means. However, the shape of blades and the placement of blades are not limited to those in the embodiments and may be appropriately changed.

(3) In the first embodiment, furthermore, the mixture drying device 10B is inclined toward the drum openable door 32 with respect to the first frame 11 by adjusting the height of the adjustment bolts 22 located on the side close to the door 32 to be lower than the bolts 22 located on the side close to the exhaust fan 41. The mixture 3 contained in the internal space 30S is collected toward the drum openable door 32 and also moved toward the exhaust fan 41 by rotating operation of the rotary drum 30 and stirring operation of the blades 72 so that the mixture 3 is actively moved back and forth in the axial direction AX. However, the mixture drying device 10B may be placed in a horizontal posture without adjusting the heights of the adjustment bolts 22 to be remarkably different in height.

(4) As with the first embodiment, the second embodiment may be arranged to place the load sensors in positions for supporting the mixture containing means. This enables controlling the rotation of the mixture containing means based on detection signals of the load sensors so that the mixture intermittently charged moves for a predetermined time from an entrance to an exit of the internal space of the containing means.

(5) In the fourth embodiment, the mixture producing device 310A including one kneading unit 311 and one mixture supplying main unit 312 and three mixture supplying sub-units 311. However, the number of sub-units, the placement of those kneading unit, mixture supplying main units, and mixture supplying sub-units is not limited and may be appropriately changed.

REFERENCE SIGNS LIST

1 Combustible waste
2 Dehydrating liquid
3 Mixture
10, 110, 210, 310 Solid fuel manufacturing apparatus
10A, 210A, 310A Mixture producing device (Mixture producing means)
20, 120 Cargo container
30, 130, 230 Rotary drum (Mixture containing means)
30S, 130S, 230S Internal space
31, 231 Inner peripheral wall (Inner peripheral wall of mixture containing means)
33 Intake port (Intake means)
41, 241 Exhaust fan (Exhaust means)
46 Heat pump (Heating means)
51, 151, 251 Motor (Drive means)
59, 259 Load sensor
60, 160, 260 Control board (Control means)
72, 273 Blade (Pulverizing means)
AR Outside air
EG Exhaust air

The invention claimed is:

1. A solid fuel manufacturing apparatus comprising:
a mixture producing means configured to produce a mixture by kneading combustible waste containing moisture and a dehydrating agent acting to accelerate removal of the moisture from the combustible waste;
a rotary drum configured to be cylindrical and rotatable, the rotary drum being configured to contain the mixture produced by the mixture producing means in an internal space;
an intake means configured to introduce outside air into the rotary drum;
an exhaust means configured to discharge exhaust air out of the rotary drum;
a drive means configured to rotate the rotary drum;
a plurality of load sensors arranged at different positions around a perimeter of the rotary drum;
a plurality of drum lower side supports located in four locations, each of the plurality of drum lower side supports provided with one of the plurality of load sensors, each of the plurality of load sensors being configured to detect a load acting on a predetermined portion of each of the plurality of drum lower side supports;
a control board configured to: (i) calculate a percentage of moisture content in the mixture within the rotary drum based on detection signals from the plurality of load sensors, (ii) control operations of the drive means based on the calculated percentage of moisture content in the mixture within the rotary drum, and (iii) control rotational movement of the drive means by changing a rotational direction of the drive means to reverse a rotational direction of the rotary drum to return a center of gravity of the rotary drum to an initial position based on each detection signal received from the plurality of load sensors;
a rake disposed inside the internal space of the rotary drum at an opening of rotary drum, the rake being formed of a plurality of rods arranged at intervals, the rake being configured to divide the mixture contained in the rotary drum; and
a breaking means configured to break up the mixture contained in the rotary drum, wherein:
the dehydrating agent is a treatment agent made of an emulsion containing synthetic resin; and
the breaking means includes a plurality of blades placed along an inner peripheral wall of the rotary drum in an axial direction and a circumferential direction of the rotary drum, the plurality of blades being configured to scoop the mixture upward in the internal space and allow the mixture to freely fall from above in the internal space by rotation of the rotary drum, each of the plurality of blades has a plate shape including a first plane and a second plane, which are bent at a predetermined bending angle, the plurality of blades being arranged at first predetermined intervals in the circumferential direction of the rotary drum, such that each first plane of each blade is tilted with respect to a tangent to the inner peripheral wall of the rotary drum and each second plane of each blade is fixed to the inner peripheral wall of the rotary drum, and the plurality of blades are arranged at second predetermined intervals in the axial direction of the rotary drum, such that the second plane of one blade of the plurality of blades that is located closest to a first end of the rotary drum is inclined in a clockwise direction with respect to the axial direction of the rotary drum, and the second plane of one blade of the plurality of blades that is located closest to a second end of the rotary drum, which is opposite to the first end in the axial direction, is inclined in a counter-clockwise direction with respect to the axial direction of the rotary drum.

2. A system comprising:
the solid fuel manufacturing apparatus according to claim 1, and
a cargo container, wherein
the solid fuel manufacturing apparatus is installed in an interior space of the cargo container for transporting the solid fuel manufacturing apparatus to a destination.

3. The solid fuel manufacturing apparatus according to claim 1, further comprising heating means configured to heat the outside air to a temperature in a range of 20° C. or higher, but 30° C. or lower when a temperature of the outside air to be introduced by the intake means is less than 20° C.

4. A method for manufacturing solid fuel using the solid fuel manufacturing apparatus according to claim 1, wherein the method includes drying and breaking up the combustible waste to produce pellet-shaped solid fuel.

5. The method for manufacturing solid fuel according to claim 4, wherein the combustible waste is at least one of: sewage sludge, food waste, crop waste, and vegetable waste.

6. The solid fuel manufacturing apparatus according to claim 2, further including heating means to heat the outside air to a temperature in a range of 20° C. or higher but 30° C. or lower when a temperature of the outside air to be introduced by the intake means is less than 20° C.

7. A method for manufacturing solid fuel using the solid fuel manufacturing apparatus according to claim 1, wherein the method includes drying and breaking up the combustible waste to produce pellet-shaped solid fuel.

8. A method for manufacturing solid fuel using the solid fuel manufacturing apparatus according to claim 2, wherein the method includes drying and breaking up the combustible waste to produce pellet-shaped solid fuel.

9. A method for manufacturing solid fuel using the solid fuel manufacturing apparatus according to claim 3, wherein the method includes drying and breaking up the combustible waste to produce pellet-shaped solid fuel.

10. A method for manufacturing solid fuel using the solid fuel manufacturing apparatus according to claim 6, wherein the method includes drying and breaking up the combustible waste to produce pellet-shaped solid fuel.

11. The method for manufacturing solid fuel according to claim 7, wherein the combustible waste is one of at least sewage sludge, food waste, crop waste, and vegetable waste.

12. The method for manufacturing solid fuel according to claim 8, wherein the combustible waste is one of at least sewage sludge, food waste, crop waste, and vegetable waste.

13. The method for manufacturing solid fuel according to claim 9, wherein the combustible waste is one of at least sewage sludge, food waste, crop waste, and vegetable waste.

14. The method for manufacturing solid fuel according to claim 10, wherein the combustible waste is one of at least sewage sludge, food waste, crop waste, and vegetable waste.

* * * * *